US012563584B2

(12) United States Patent
Petkov et al.

(10) Patent No.: US 12,563,584 B2
(45) Date of Patent: Feb. 24, 2026

(54) METHOD AND SYSTEM FOR INCREASING PROBABILITY OF TRANSMISSION IN A SUBSCRIBER NETWORK

(71) Applicant: Diehl Metering GmbH, Ansbach (DE)

(72) Inventors: Hristo Petkov, Nuremberg (DE); Raphael Mzyk, Kammerstein (DE); Thomas Kauppert, Nuremberg (DE); Klaus Gottschalk, Winkelhaid (DE); Gerd Kilian, Erlangen (DE); Josef Bernhard, Nabburg (DE); Jakob Kneissl, Fuerth (DE); Johannes Wechsler, Spalt (DE); Raimund Meyer, Fuerth (DE); Dominik Soller, Schwaig (DE); Michael Schlicht, Erlangen (DE); Frank Obernosterer, Nuremberg (DE)

(73) Assignee: Diehl Metering GmbH, Ansbach (DE)

( * ) Notice: Subject to any disclaimer, the term of this patent is extended or adjusted under 35 U.S.C. 154(b) by 529 days.

(21) Appl. No.: 17/897,416

(22) Filed: Aug. 29, 2022

(65) Prior Publication Data

US 2022/0417953 A1      Dec. 29, 2022

Related U.S. Application Data

(63) Continuation of application No. PCT/EP2021/054625, filed on Feb. 25, 2021.

(30) Foreign Application Priority Data

Feb. 28, 2020   (DE) ..................... 10 2020 202 606.8

(51) Int. Cl.
*H04W 72/542* (2023.01)
*H04B 1/7143* (2011.01)
*H04W 28/02* (2009.01)

(52) U.S. Cl.
CPC ........ *H04W 72/542* (2023.01); *H04B 1/7143* (2013.01); *H04W 28/0268* (2013.01)

(58) Field of Classification Search
CPC ........... H04W 72/542; H04W 28/0268; H04W 72/0446; H04W 72/0453; H04W 72/543; H04W 72/02; H04B 1/7143
See application file for complete search history.

(56) References Cited

U.S. PATENT DOCUMENTS

| | | | |
|---|---|---|---|
| 6,978,140 B1 | 12/2005 | Aretz et al. | |
| 7,359,343 B2 | 4/2008 | Goodings | |

(Continued)

FOREIGN PATENT DOCUMENTS

| | | |
|---|---|---|
| DE | 10164665 A1 | 8/2002 |
| DE | 102016220883 A1 | 4/2018 |

(Continued)

*Primary Examiner* — Afshawn M Towfighi
(74) *Attorney, Agent, or Firm* — Laurence A. Greenberg; Werner H. Stemer; Ralph E. Locher

(57) ABSTRACT

A subscriber in a communication system is configured to transmit data to a base station of the communication system. The subscriber is configured to take a quality criterion of at least one previous transmission between the subscriber and the base station as a basis for transmitting the data in a first frequency range or in a second frequency range being different from each other, and/or in a first time interval or in a second time interval being different from each other. A base station, a method for receiving data and a computer program product are also provided.

6 Claims, 22 Drawing Sheets

(56) References Cited

U.S. PATENT DOCUMENTS

| | | | | |
|---|---|---|---|---|
| 11,246,082 | B1 * | 2/2022 | McConnell ... | H04W 36/008357 |
| 11,258,722 | B2 | 2/2022 | Bernhard et al. | |
| 2018/0042043 | A1 * | 2/2018 | Babaei ............. | H04W 72/0446 |
| 2019/0036833 | A1 * | 1/2019 | Bernhard ............. | H04L 47/365 |
| 2019/0132839 | A1 * | 5/2019 | Li ........................ | H04W 74/04 |
| 2019/0223042 | A1 * | 7/2019 | Su ........................ | H04L 5/0058 |
| 2019/0253101 | A1 * | 8/2019 | Kilian ................... | H04L 7/0008 |
| 2019/0373557 | A1 * | 12/2019 | Agardh ............. | H04W 52/0251 |
| 2019/0387289 | A1 * | 12/2019 | Petkov ................... | G08C 17/02 |
| 2020/0044687 | A1 | 2/2020 | Wechsler | |
| 2020/0153554 | A1 * | 5/2020 | Nguyen ............... | H04W 72/23 |
| 2021/0385822 | A1 * | 12/2021 | Chae ................... | H04W 72/02 |

FOREIGN PATENT DOCUMENTS

| | | | |
|---|---|---|---|
| DE | 102017206236 | A1 | 10/2018 |
| EP | 1641187 | A1 | 3/2006 |
| WO | 0228136 | A1 | 4/2002 |
| WO | 2015172740 | A1 | 11/2015 |
| WO | 2017162742 | A2 | 9/2017 |

* cited by examiner

PER vs sensor nodes sorted according to reception levels

Send data from a subscriber in the communication system to a base station in the communication system, wherein a quality criterion of at least one preceding transmission between the subscriber and the base station is taken as a basis for transmitting the data
- in a first frequency range or in a second frequency range, the first frequency range and the second frequency range being different, and/or
- in a first time interval or in a second time interval, the first time interval and the second time interval being different

Receive data sent from a subscriber in the communication system to a base station in the communication system, wherein a quality criterion of at least one preceding transmission between the subscriber and the base station is taken as a basis for transmitting the data

- in a first frequency range or in a second frequency range, the first frequency range and the second frequency range being different, and/or

- in a first time interval or in a second time interval, the first time interval and the second time interval being different

Send data from a subscriber in the communication system to a base station in the communication system, a demanded quality of service being taken as a basis for transmitting the data

- in a first frequency range or in a second frequency range, the first frequency range and the second frequency range being different, and/or

- in a first time interval or in a second time interval, the first time interval and the second time interval being different

Receive data sent from a subscriber in the communication system to a base station in the communication system, wherein a demanded quality of service is taken as a basis for transmitting the data

- in a first frequency range or in a second frequency range, the first frequency range and the second frequency range being different, and/or

- in a first time interval or in a second time interval, the first time interval and the second time interval being different

Figure 21:
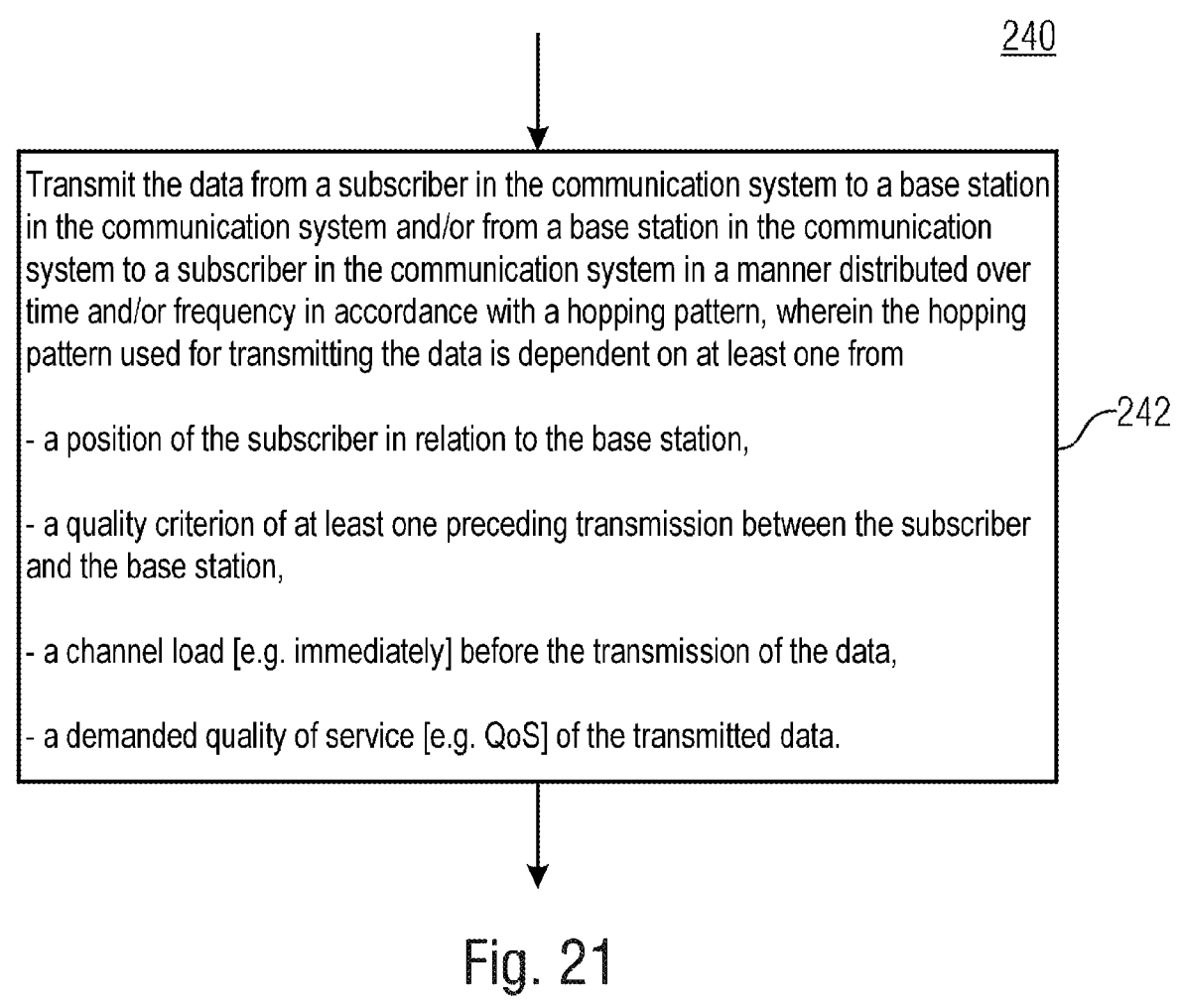

Transmit the data from a subscriber in the communication system to a base station in the communication system and/or from a base station in the communication system to a subscriber in the communication system in a manner distributed over time and/or frequency in accordance with a hopping pattern, wherein the hopping pattern used for transmitting the data is dependent on at least one from

- a position of the subscriber in relation to the base station,

- a quality criterion of at least one preceding transmission between the subscriber and the base station,

- a channel load [e.g. immediately] before the transmission of the data,

- a demanded quality of service [e.g. QoS] of the transmitted data.

METHOD AND SYSTEM FOR INCREASING PROBABILITY OF TRANSMISSION IN A SUBSCRIBER NETWORK

CROSS-REFERENCE TO RELATED APPLICATION

This application is a continuation, under 35 U.S.C. § 120, of copending International Patent Application PCT/EP2021/054625, filed Feb. 25, 2021, which designated the United States; this application also claims the priority, under 35 U.S.C. § 119, of German Patent Application DE 10 2020 202 606.8, filed Feb. 28, 2020; the prior applications are herewith incorporated by reference in their entirety.

FIELD AND BACKGROUND OF THE INVENTION

Exemplary embodiments of the present invention relate to a subscriber in a communication system. Further exemplary embodiments relate to a base station in a communication system. Some exemplary embodiments relate to a concept for increasing the probability of getting through for subscribers with poor reception conditions or high QoS requirements in communication systems with a high density of subscribers.

If the density of subscribers is at an appropriate level, wireless communication systems are interference-limited, i.e. the network capacity is limited by co-channel interference (self-interference), which arises as a result of users that are transmitting on the same frequency at the same time interfering with one another. A measure used for quality is the carrier-to-interference ratio, CIR. The higher the CIR, the better the quality of the voice or data connection. Capacity-increasing measures based on improving the carrier-to-interference ratio CIR in the network are widely described in the literature [7, 9].

CIR improvements are possible inter alia by:
increasing the received useful power C,
decreasing the noise power I,
averaging useful power and noise power, with the result that the probability of very high or very low CIR values falls.

SUMMARY OF THE INVENTION

It is accordingly an object of the invention to provide a subscriber in a wireless communication system, a base station, a method for receiving data and a computer program, which increase the probability of getting through for subscribers with poor reception conditions or high QoS requirements in communication systems with a high density of subscribers and which overcome the hereinafore-mentioned disadvantages of the heretofore-known subscribers, methods and programs of this general type.

This object is achieved by the independent patent claims.

Advantageous developments can be found in the dependent patent claims.

With the foregoing and other objects in view there is provided, in accordance with the invention, a subscriber in a [e.g. uncoordinated] wireless communication system, wherein the communication system includes a multiplicity of uncoordinated subscribers, [e.g. wherein the communication system communicates in a frequency band [e.g. ISM band] that is used for communication by a multiplicity of uncoordinated communication systems] wherein the subscriber is configured to send data to a base station in the communication system, wherein the subscriber is configured to take a [e.g. estimated or ascertained] quality criterion [e.g. minimum reception level, RXLEV, and/or bit or block error rates, RXQUAL] of at least one preceding transmission between the subscriber and the base station as a basis for transmitting the data in a first frequency range [e.g. of the frequency band] or in a second frequency range [e.g. of the frequency band], the first frequency range and the second frequency range being different, and/or in a first time interval or in a second time interval, the first time interval and the second time interval being different.

In exemplary embodiments, the subscriber is configured to transmit the data in the first frequency range and/or in the first time interval if the quality criterion is in a first quality criterion range or is greater than or equal to a quality criterion threshold, wherein the subscriber is configured to transmit the data in the second frequency range and/or in the second time interval if the quality criterion is in a second quality criterion range or is less than the quality criterion threshold.

In exemplary embodiments, the at least one preceding transmission between the subscriber and the base station includes at least one transmission of a beacon or a transmission of data from the base station to the subscriber, wherein the subscriber is configured to ascertain or estimate the quality criterion of the at least one transmission of the beacon or of the at least one transmission of data from the base station to the subscriber.

In exemplary embodiments, the at least one preceding transmission includes at least one preceding transmission of data from the subscriber to the base station, wherein the subscriber is configured to receive a transmission of data from the base station, wherein the transmission of data from the base station includes information about the quality criterion of the at least one preceding transmission of data from the subscriber to the base station.

In exemplary embodiments, the quality criterion is at least one from
a minimum reception level,
a bit error rate,
a block error rate,
a packet error rate,
a signal-to-noise ratio,
a signal-to-interference ratio,
a ratio between detected transmissions of data and undetected transmissions of data from the subscriber.

In exemplary embodiments, the subscriber is configured to provide the data for transmission in the first frequency range and/or time interval with a first code rate, wherein the subscriber is configured to provide the data for transmission in the second frequency range and/or time interval with a second code rate, the first code rate being greater than the second code rate.

In exemplary embodiments, the subscriber is configured to transmit the data in the first frequency range and/or first time interval in accordance with a first hopping pattern [e.g. from a first hopping pattern group], wherein the subscriber is configured to transmit the data in the second frequency range and/or second time interval in accordance with a second hopping pattern [e.g. from a second hopping pattern group], the first hopping pattern and the second hopping pattern being different.

In exemplary embodiments, the first hopping pattern is one from a first group of hopping patterns that is associated with the first frequency range and/or time interval, wherein the second hopping pattern is one from a second group of hopping patterns that is associated with the second frequency range and/or time interval, the first group of hopping patterns and the second group of hopping patterns being different.

In exemplary embodiments, the subscriber is further configured to take a demanded or freshly obtained quality of service [e.g. (low) blocking rate, (guaranteed) latency, (guaranteed) reaction time, reduction in blocking probability, or change of priority, e.g. due to alarm or emergency shutdown] of the data to be transmitted as a basis for transmitting the data in the first frequency range [e.g. of the frequency band] or in the second frequency range [e.g. of the frequency band], and/or in the first time interval or in the second time interval.

Further exemplary embodiments provide a base station in a [e.g. uncoordinated] wireless communication system, wherein the communication system includes a multiplicity of uncoordinated subscribers, [e.g. wherein the communication system communicates in a frequency band [e.g. ISM band] that is used for communication by a multiplicity of uncoordinated communication systems] wherein the base station is configured to receive data from a subscriber in the communication system, wherein a [e.g. estimated or ascertained] quality criterion [e.g. minimum reception level, RXLEV, and/or bit or block error rates, RXQUAL] of at least one preceding transmission between the subscriber and the base station is taken as a basis for transmitting the data in a first frequency range [e.g. of the frequency band] or in a second frequency range [e.g. of the frequency band], the first frequency range and the second frequency range being different, and/or in a first time interval or in a second time interval, the first time interval and the second time interval being different.

In exemplary embodiments, the data are transmitted in the first frequency range and/or in the first time interval if the quality criterion is in a first quality criterion range or is greater than or equal to a quality criterion threshold, wherein the data are transmitted in the second frequency range and/or in the second time interval if the quality criterion is in a second quality criterion range or is less than the quality criterion threshold.

In exemplary embodiments, the at least one preceding transmission includes at least one preceding transmission of data from the subscriber to the base station, wherein the base station is configured to ascertain the quality criterion on the basis of the at least one preceding transmission of data from the subscriber to the base station, wherein the base station is configured to send to the subscriber data that include information about the quality criterion of the at least one preceding transmission of data from the subscriber to the base station.

In exemplary embodiments, the quality criterion is at least one from a minimum reception level, a bit error rate, a block error rate, a packet error rate, a signal-to-noise ratio, a signal-to-interference ratio, a ratio between detected transmissions of data and undetected transmissions of data from the subscriber.

In exemplary embodiments, the data transmitted in the first frequency range and/or first time interval are provided with a first code rate, wherein the data transmitted in the second frequency range and/or second time interval are provided with a second code rate, the first code rate being greater than the second code rate.

In exemplary embodiments, the data are transmitted in the first frequency range and/or first time interval in accordance with a first hopping pattern [e.g. from a first hopping pattern group], wherein the data are transmitted in the second frequency range and/or second time interval in accordance with a second hopping pattern [e.g. from a second hopping pattern group], the first hopping pattern and the second hopping pattern being different.

In exemplary embodiments, the first hopping pattern is one from a first group of hopping patterns that is associated with the first frequency range and/or time interval, wherein the second hopping pattern is one from a second group of hopping patterns that is associated with the second frequency range and/or time interval, the first group of hopping patterns and the second group of hopping patterns being different.

In exemplary embodiments, a demanded or freshly obtained quality of service [e.g. (low) blocking rate, (guaranteed) latency, (guaranteed) reaction time, reduction in blocking probability, or change of priority, e.g. due to alarm or emergency shutdown] of the data to be transmitted is taken as a basis for transmitting the data in the first frequency range [e.g. of the frequency band] or in the second frequency range [e.g. of the frequency band], and/or in the first time interval or in the second time interval.

Further exemplary embodiments provide a method for sending data in a [e.g. uncoordinated] wireless communication system, wherein the communication system includes a multiplicity of uncoordinated subscribers. The method includes a step of sending data from a subscriber in the communication system to a base station in the communication system, wherein a [e.g. estimated or ascertained] quality criterion [e.g. minimum reception level, RXLEV, and/or bit or block error rates, RXQUAL] of at least one preceding transmission between the subscriber and the base station is taken as a basis for transmitting the data in a first frequency range [e.g. of the frequency band] or in a second frequency range [e.g. of the frequency band], the first frequency range and the second frequency range being different, and/or in a first time interval or in a second time interval, the first time interval and the second time interval being different.

Further exemplary embodiments provide a method for receiving data in a [e.g. uncoordinated] wireless communication system, wherein the communication system includes a multiplicity of uncoordinated subscribers. The method includes a step of receiving data sent from a subscriber in the communication system to a base station in the communication system, wherein a [e.g. estimated or ascertained] quality criterion [e.g. minimum reception level, RXLEV, and/or bit or block error rates, RXQUAL] of at least one preceding transmission between the subscriber and the base station is taken as a basis for transmitting the data in a first frequency range [e.g. of the frequency band] or in a second frequency range [e.g. of the frequency band], the first frequency range and the second frequency range being different, and/or in a first time interval or in a second time interval, the first time interval and the second time interval being different.

Further exemplary embodiments provide a subscriber in a [e.g. uncoordinated] wireless communication system, wherein the communication system includes a multiplicity of uncoordinated subscribers, [e.g. wherein the communication system communicates in a frequency band [e.g. ISM band] that is used for communication by a multiplicity of uncoordinated communication systems] wherein the subscriber is configured to send data to a base station in the communication system, wherein the subscriber is configured to take a demanded quality of service [QoS] [e.g. (low) blocking rate, or (guaranteed) latency, or (guaranteed) reaction time] of the data to be transmitted as a basis for transmitting the data in a first frequency range [e.g. of the frequency band] or in a second frequency range [e.g. of the frequency band], the first frequency range and the second frequency range being different, and/or in a first time interval or in a second time interval, the first time interval and the second time interval being different.

In exemplary embodiments, the subscriber is configured to transmit the data in the first frequency range and/or in the first time interval if the demanded quality of service is in a first quality of service range or is less than or equal to a quality of service threshold, wherein the subscriber is configured to transmit the data in the second frequency range and/or in the second time interval if the demanded quality of service is in a second quality of service range or is greater than the quality of service threshold.

In exemplary embodiments, the subscriber is configured so as, if the demanded quality of service is in a first quality of service range or is less than or equal to a quality of service threshold, to transmit isolated transmissions of data from a series of transmissions of data in the second frequency range and/or in the second time interval.

In exemplary embodiments, the demanded quality of service is at least one from a demanded latency, a demanded reaction time, a demanded maximum blocking rate.

In exemplary embodiments, the subscriber is configured to provide the data for transmission in the first frequency range and/or time interval with a first code rate, wherein the subscriber is configured to provide the data for transmission in the second frequency range and/or time interval with a second code rate, the first code rate being less than the second code rate.

In exemplary embodiments, the subscriber is configured to transmit the data in the first frequency range and/or first time interval in accordance with a first hopping pattern [e.g. from a first hopping pattern group], wherein the subscriber is configured to transmit the data in the second frequency range and/or second time interval in accordance with a second hopping pattern [e.g. from a second hopping pattern group], the first hopping pattern and the second hopping pattern being different.

In exemplary embodiments, the first hopping pattern is one from a first group of hopping patterns that is associated with the first frequency range and/or time interval, wherein the second hopping pattern is one from a second group of hopping patterns that is associated with the second frequency range and/or time interval, the first group of hopping patterns and the second group of hopping patterns being different.

Further exemplary embodiments provide a base station in a [e.g. uncoordinated] wireless communication system, wherein the communication system includes a multiplicity of uncoordinated subscribers, [e.g. wherein the communication system communicates in a frequency band [e.g. ISM band] that is used for communication by a multiplicity of uncoordinated communication systems] wherein the base station is configured to receive data from a subscriber in the communication system, wherein a demanded quality of service [QoS] [e.g. (low) blocking rate, or (guaranteed) latency, or (guaranteed) reaction time] of the data is taken as a basis for transmitting the data in a first frequency range [e.g. of the frequency band] or in a second frequency range [e.g. of the frequency band], the first frequency range and the second frequency range being different, and/or in a first time interval or in a second time interval, the first time interval and the second time interval being different.

In exemplary embodiments, the data are transmitted in the first frequency range and/or in the first time interval if the demanded quality of service is in a first quality of service range or is greater than or equal to a quality of service threshold, wherein the data are transmitted in the second frequency range and/or in the second time interval if the demanded quality of service is in a second quality of service range or is less than the quality of service threshold.

In exemplary embodiments, the demanded quality of service is at least one from a demanded latency, a demanded reaction time, a demanded maximum blocking rate.

In exemplary embodiments, the data transmitted in the first frequency range and/or first time interval are provided with a first code rate, wherein the data transmitted in the second frequency range and/or second time interval are provided with a second code rate, the first code rate being greater than the second code rate.

In exemplary embodiments, the data are transmitted in the first frequency range and/or first time interval in accordance with a first hopping pattern [e.g. from a first hopping pattern group], wherein the data are transmitted in the second frequency range and/or second time interval in accordance with a second hopping pattern [e.g. from a second hopping pattern group], the first hopping pattern and the second hopping pattern being different.

In exemplary embodiments, the first hopping pattern is one from a first group of hopping patterns that is associated with the first frequency range and/or time interval, wherein the second hopping pattern is one from a second group of hopping patterns that is associated with the second frequency range and/or time interval, the first group of hopping patterns and the second group of hopping patterns being different.

Further exemplary embodiments provide a method for sending data in a [e.g. uncoordinated] wireless communication system, wherein the communication system includes a multiplicity of uncoordinated subscribers. The method includes a step of sending data from a subscriber in the communication system to a base station in the communication system, wherein a demanded quality of service [QoS] [e.g. (low) blocking rate, or (guaranteed) latency, or (guaranteed) reaction time] of the data is taken as a basis for transmitting the data in a first frequency range [e.g. of the frequency band] or in a second frequency range [e.g. of the frequency band], the first frequency range and the second frequency range being different, and/or in a first time interval or in a second time interval, the first time interval and the second time interval being different.

Further exemplary embodiments provide a method for receiving data in a [e.g. uncoordinated] wireless communication system, wherein the communication system includes a multiplicity of uncoordinated subscribers. The method includes a step of receiving data sent from a subscriber in the communication system to a base station in the communication system, wherein a demanded quality of service [QoS] [e.g. (low) blocking rate, or (guaranteed) latency, or (guaranteed) reaction time] of the data is taken as a basis for transmitting the data in a first frequency range [e.g. of the frequency band] or in a second frequency range [e.g. of the frequency band], the first frequency range and the second frequency range being different, and/or in a first time interval or in a second time interval, the first time interval and the second time interval being different.

Further exemplary embodiments provide a subscriber in a [e.g. uncoordinated or coordinated] wireless communication system, [e.g. wherein the communication system communicates in a frequency band that is used for communication by a multiplicity of uncoordinated communication systems] wherein the subscriber is configured to send data to a base station in the communication system and/or to receive data from the base station in the communication system in a manner distributed over time and/or frequency in accordance with a hopping pattern, wherein the hopping pattern used for transmitting the data is dependent on a position of the subscriber in relation to the base station, and/or a quality criterion [e.g. RSSI (RSSI=received signal strength indication), PER (PER=packet error rate), BER (BER=bit error rate), SIR (SIR=signal-to-interference ratio), SNR (SNR=signal-to-noise ratio)] of at least one preceding transmission between the subscriber and the base station, and/or a channel load [e.g. immediately] before the transmission of the data, and/or a demanded quality of service [e.g. QoS] of the transmitted data.

In exemplary embodiments, the hopping pattern used for transmitting the data is dependent on the position of the subscriber in relation to the base station, wherein the subscriber is configured to send and/or receive the data in accordance with a first hopping pattern [e.g. from a first group of hopping patterns] if the position of the subscriber falls within a first region of a geographical area covered by the base station, wherein the subscriber is configured to transmit the data in accordance with a second hopping pattern if the position of the subscriber falls within a second region of the geographical area covered by the base station, the first hopping pattern and the second hopping pattern being different, the first region and the second region being different.

In exemplary embodiments, the first region and the second region differ in terms of distances from the base station, and/or quality criteria [e.g RSSI, PER, BER, SIR, SNR].

By way of example, the subscribers may be divided into regions according to positions [e.g. if the respective coordinates of the subscribers are known e.g. by way of localization] or according to RSSI or according to quality, the regions differing in that they distinguish between subscribers that are at lesser and greater distances, or between subscribers whose signals have higher and lower RSSI (power levels), or between subscribers whose transmitted data have better and worse quality, wherein different regions have different associated hopping patterns.

In exemplary embodiments, the first hopping pattern is one from a first group of hopping patterns that is associated with the first region, wherein the second hopping pattern is one from a second group of hopping patterns that is associated with the second region, the first group of hopping patterns and the second group of hopping patterns being different.

In exemplary embodiments, the hopping pattern of at least one region from the first region and the second region differs from a hopping pattern of a region [e.g. of a geographical area that is adjacent to the geographical area] that adjoins or at least partially overlaps the at least one region and that is covered [e.g. served] by an adjacent base station in the communication system.

In exemplary embodiments, the first hopping pattern of the first region differs from a further first hopping pattern of a further first region of a geographical area that is adjacent to the geographical area and covered by an adjacent base station in the communication system, and/or wherein the second hopping pattern of the second region differs from a further second hopping pattern of a further second region of the geographical area that is adjacent to the geographical area and covered by the adjacent base station in the communication system.

By way of example, the hopping patterns or hopping pattern groups may be used repeatedly for an adjacent base station, the association of the regions with hopping pattern with hopping pattern groups differing for the adjacent base station.

By way of example, the hopping patterns or the hopping pattern groups for the adjacent base station may be assigned in exactly the opposite manner.

In exemplary embodiments, at least one from the first hopping pattern of the first area and the second hopping pattern of the second area is used for a further region of a geographical area that is adjacent to the geographical area and covered by an adjacent base station in the communication system.

By way of example, specific hopping patterns or hopping pattern groups may be repeated for the adjacent base stations and others may not be repeated.

In exemplary embodiments, the hopping pattern used for transmitting the data is dependent on a quality criterion of at least one preceding transmission between the subscriber and the base station, wherein the at least one preceding transmission between the subscriber and the base station includes at least one transmission [e.g. link transmission, beacon transmission or downlink data transmission] from the base station to the subscriber, wherein the subscriber is configured to ascertain or estimate the quality of the at least one transmission from the base station.

In exemplary embodiments, the hopping pattern used for transmitting the data is dependent on a quality criterion of at least one preceding transmission between the subscriber and the base station, wherein the at least one preceding transmission is at least one preceding transmission of data from the subscriber to the base station, wherein the subscriber is configured to receive a transmission of data from the base station, wherein the transmission of data from the base station includes information about the quality criterion of the at least one preceding transmission of data from the subscriber.

In exemplary embodiments, the subscriber is configured to send and/or receive the data in accordance with a first hopping pattern if the quality criterion is in a first quality criterion range, wherein the subscriber is configured to send and/or receive the data in accordance with a second hopping pattern if the quality criterion is in a second quality criterion range, the first hopping pattern and the second hopping pattern being different, the first quality criterion range and the second quality criterion range being different.

In exemplary embodiments, the first hopping pattern is one from a first group of hopping patterns that is associated with the first quality criterion range, wherein the second hopping pattern is one from a second group of hopping patterns that is associated with the second quality criterion range, the first group of hopping patterns and the second group of hopping patterns being different.

In exemplary embodiments, the quality criterion is at least one from a minimum reception level, a bit error rate, a block error rate, a packet error rate, a signal-to-noise ratio, a signal-to-interference ratio, a ratio between detected transmissions of data and undetected transmissions of data from the subscriber.

In exemplary embodiments, the hopping pattern used for transmitting the data is dependent on a demanded quality of service of the data, wherein the subscriber is configured to send and/or receive the data in accordance with a first hopping pattern if the demanded quality of service is in a first quality of service range, wherein the subscriber is configured to send and/or receive the data in accordance with a second hopping pattern if the demanded quality of service is in a second quality of service range, the first hopping pattern and the second hopping pattern being different, the first quality of service range and the second quality of service range being different.

In exemplary embodiments, the first hopping pattern is one from a first group of hopping patterns that is associated with the first quality of service range, wherein the second hopping pattern is one from a second group of hopping patterns that is associated with the second quality of service range, the first group of hopping patterns and the second group of hopping patterns being different.

In exemplary embodiments, the demanded quality of service is at least one from a demanded latency, a demanded reaction time, a demanded maximum blocking rate.

Further exemplary embodiments provide a base station in a [e.g. uncoordinated or coordinated] wireless communication system, [e.g. wherein the communication system communicates in a frequency band that is used for communication by a multiplicity of uncoordinated communication systems] wherein the base station is configured to send data to a subscriber in the communication system and/or to receive data from the subscriber in the communication system in a manner distributed over time and/or frequency in accordance with a hopping pattern, wherein the hopping pattern used for transmitting the data is dependent on a position of the subscriber in relation to the base station, and/or a quality criterion [e.g. RSSI (RSSI=received signal strength indication), PER (PER=packet error rate), BER (BER=bit error rate), SIR (SIR=signal-to-interference ratio), SNR (SNR=signal-to-noise ratio)] of at least one preceding transmission between the subscriber and the base station, and/or a channel load [e.g. immediately] before the transmission of the data, and/or a demanded quality of service [e.g. QoS] of the transmitted data.

In exemplary embodiments, the hopping pattern used for transmitting the data is dependent on the position of the subscriber in relation to the base station, wherein the data are transmitted in accordance with a first hopping pattern [e.g. from a first group of hopping patterns] if the position of the subscriber falls within a first region of a geographical area covered by the base station, wherein the data are transmitted in accordance with a second hopping pattern if the position of the subscriber falls within a second region of the geographical area covered by the base station, the first hopping pattern and the second hopping pattern being different, the first region and the second region being different.

In exemplary embodiments, the first region and the second region differ in terms of distances from the base station, and/or quality criteria [e.g RSSI, PER, BER, SIR, SNR].

By way of example, the subscribers may be divided into regions according to positions [e.g. if the respective coordinates of the subscribers are known e.g. by way of localization] or according to RSSI or according to quality, the regions differing in that they distinguish between subscribers that are at lesser and greater distances, or between subscribers whose signals have higher and lower RSSI (power levels), or between subscribers whose transmitted data have better and worse quality, wherein different regions have different associated hopping patterns.

In exemplary embodiments, the first hopping pattern is one from a first group of hopping patterns that is associated with the first region, wherein the second hopping pattern is one from a second group of hopping patterns that is associated with the second region, the first group of hopping patterns and the second group of hopping patterns being different.

In exemplary embodiments, the hopping pattern of at least one region from the first region and the second region differs from a hopping pattern of a region [e.g. of a geographical area that is adjacent to the geographical area] that adjoins or at least partially overlaps the at least one region and that is covered [e.g. served] by an adjacent base station in the communication system.

In exemplary embodiments, the first hopping pattern of the first region differs from a further first hopping pattern of a further first region of a geographical area that is adjacent to the geographical area and covered by an adjacent base station in the communication system, and/or wherein the second hopping pattern of the second region differs from a further second hopping pattern of a further second region of the geographical area that is adjacent to the geographical area and covered by the adjacent base station in the communication system.

By way of example, the hopping patterns or hopping pattern groups may be used repeatedly for an adjacent base station, the association of the regions with hopping pattern with hopping pattern groups differing for the adjacent base station.

By way of example, the hopping patterns or the hopping pattern groups for the adjacent base stations may be assigned in exactly the opposite manner.

In exemplary embodiments, at least one from the first hopping pattern of the first area and the second hopping pattern of the second area is used for a further region of a geographical area that is adjacent to the geographical area and covered by an adjacent base station in the communication system.

By way of example, specific hopping patterns or hopping pattern groups may be repeated for the adjacent base stations and others may not be repeated.

In exemplary embodiments, the hopping pattern used for transmitting the data is dependent on a quality criterion of at least one preceding transmission between the subscriber and the base station, wherein the at least one preceding transmission between the subscriber and the base station includes at least one transmission [e.g. link transmission, beacon transmission or downlink data transmission] from the base station to the subscriber, wherein the subscriber is configured to ascertain or estimate the quality of the at least one beacon transmission from the base station.

In exemplary embodiments, the hopping pattern used for transmitting the data is dependent on a quality criterion of at least one preceding transmission between the subscriber and the base station, wherein the at least one preceding transmission is at least one preceding transmission of data from the subscriber, wherein the subscriber is configured to receive a transmission of data from the base station, wherein the transmission of data from the base station includes information about the quality criterion of the at least one preceding transmission of data from the subscriber.

In exemplary embodiments, the subscriber is configured to send and/or receive the data in accordance with a first hopping pattern if the quality criterion is in a first quality criterion range, wherein the subscriber is configured to send and/or receive the data in accordance with a second hopping pattern if the quality criterion is in a second quality criterion range, the first hopping pattern and the second hopping pattern being different, the first quality criterion range and the second quality criterion range being different.

In exemplary embodiments, the first hopping pattern is one from a first group of hopping patterns that is associated with the first quality criterion range, wherein the second hopping pattern is one from a second group of hopping patterns that is associated with the second quality criterion range, the first group of hopping patterns and the second group of hopping patterns being different.

In exemplary embodiments, the quality criterion is at least one from a minimum reception level, a bit error rate, a block error rate, a packet error rate, a signal-to-noise ratio, a signal-to-interference ratio, a ratio between detected transmissions of data and undetected transmissions of data from the subscriber.

In exemplary embodiments, the hopping pattern used for transmitting the data is dependent on a demanded quality of service of the data, wherein the subscriber is configured to send and/or receive the data in accordance with a first hopping pattern if the demanded quality of service is in a first quality of service range, wherein the subscriber is configured to send and/or receive the data in accordance with a second hopping pattern if the demanded quality of service is in a second quality of service range, the first hopping pattern and the second hopping pattern being different, the first quality of service range and the second quality of service range being different.

In exemplary embodiments, the first hopping pattern is one from a first group of hopping patterns that is associated with the first quality of service range, wherein the second hopping pattern is one from a second group of hopping patterns that is associated with the second quality of service range, the first group of hopping patterns and the second group of hopping patterns being different.

In exemplary embodiments, the demanded quality of service is at least one from a demanded latency, a demanded reaction time, a demanded maximum blocking rate.

Further exemplary embodiments provide a method for transmitting data in an [e.g. uncoordinated or coordinated] wireless communication system. The method includes a step of transmitting data from a subscriber in the communication system to a base station in the communication system and/or from a base station in the communication system to a subscriber in the communication system in a manner distributed over time and/or frequency in accordance with a hopping pattern, wherein the hopping pattern used for transmitting the data is dependent on a position of the subscriber in relation to the base station, and/or a quality criterion [e.g. RSSI, PER, BER, SIR, SNR] of at least one preceding transmission between the subscriber and the base station, and/or a channel load [e.g. immediately] before the transmission of the data, and/or a demanded quality of service [e.g. QoS] of the transmitted data.

Further exemplary embodiments provide a computer program for carrying out one of the methods described herein when the method takes place on a computer, microprocessor or SDR receiver (SDR=software defined radio, a transmitter and/or receiver, wherein smaller or larger proportions of the signal processing are implemented using software).

Exemplary embodiments use a distinct frequency range and/or a distinct time interval for subscribers (e.g. sensor nodes) with permanently poor reception conditions or for subscribers (e.g. sensor nodes) with high QoS requirements.

Other features which are considered as characteristic for the invention are set forth in the appended claims.

Although the invention is illustrated and described herein as embodied in a subscriber in a wireless communication system, a base station, a method for receiving data and a computer program, for increasing the probability of getting through for subscribers with poor reception conditions or high QoS requirements in communication systems with a high density of subscribers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 9 is a graph of packet error rates for different convolution codes with the rates ½ and ⅓ over the subscribers sorted on the basis of their reception levels, as a quality criterion, by way of illustration, when two separate frequency ranges are used;

FIG. 17 is a flowchart for a method for sending data in a wireless communication system, according to an exemplary embodiment of the present invention;

FIG. 18 is a flowchart for a method for receiving data in a wireless communication system, according to an exemplary embodiment of the present invention;

FIG. 19 is a flowchart for a method for sending data in a wireless communication system, according to an exemplary embodiment of the present invention;

FIG. 20 is a flowchart for a method for receiving data in a wireless communication system, according to an exemplary embodiment of the present invention; and FIG. 21 is a flowchart for a method for transmitting data in a wireless communication system, according to an exemplary embodiment of the present invention.

DETAILED DESCRIPTION OF THE INVENTION

In the description of the exemplary embodiments of the present invention that follows, elements that are identical or have an identical effect are provided with the same reference sign in the figures, which means that the description of those elements is interchangeable among them.

Figure 1:
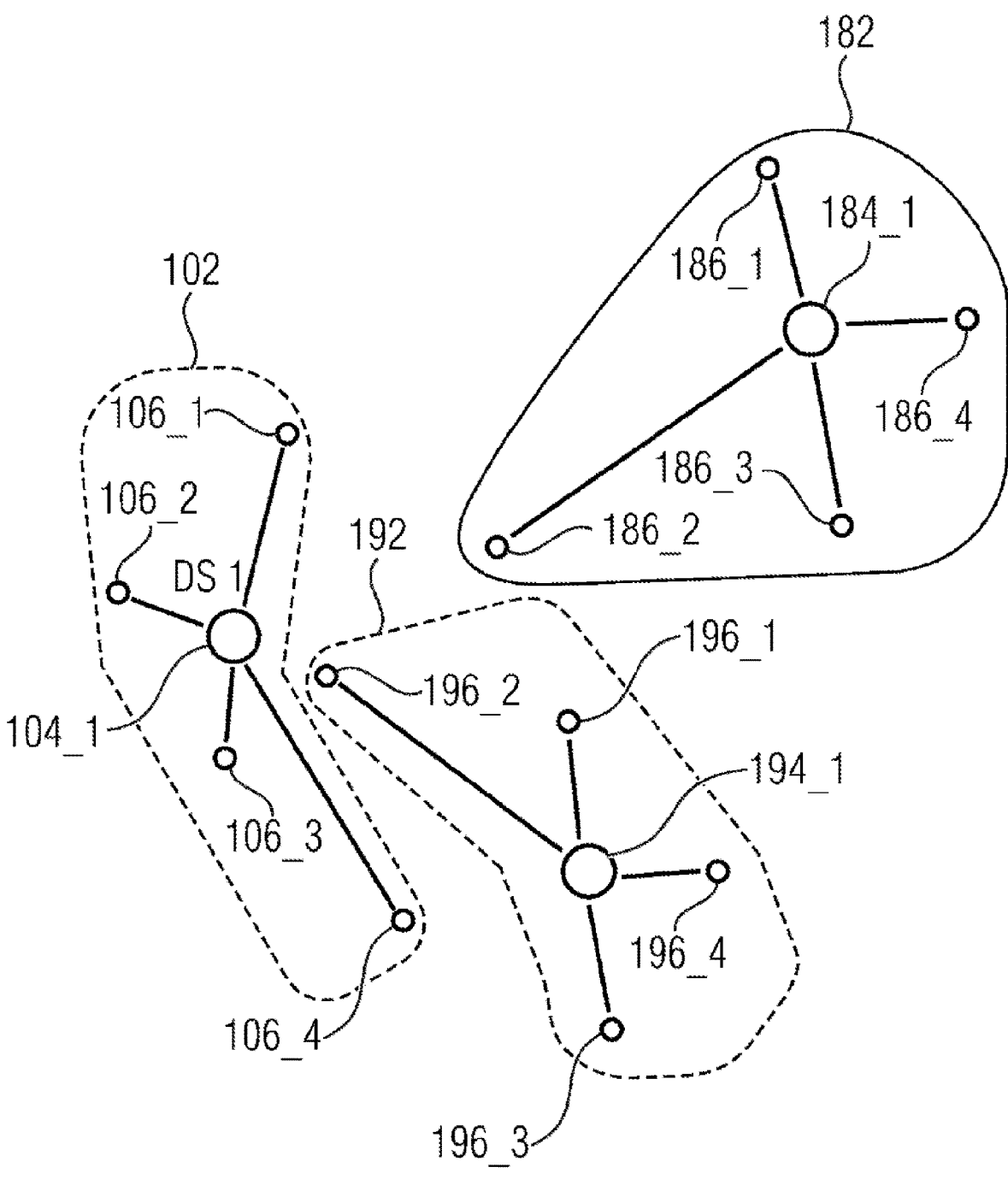
FIG. 1 shows a schematic block diagram of a communication arrangement with a first communication system according to an exemplary embodiment of the present invention.

Referring now to the figures of the drawings in detail and first, particularly, to FIG. 1 thereof, there is seen a schematic block diagram of a communication system 102 with a multiplicity of uncoordinated subscribers 106_1-106_$n$, according to an exemplary embodiment of the present invention. The communication system 102 may include a base station 104_1 and a multiplicity of subscribers 106_1-106_$n$. In the exemplary embodiment shown in FIG. 1, the communication system 102 includes four subscribers 106_1-106_4 for the purposes of illustration, but the communication system 104_1 may equally include 10, 100, 1000, 10,000 or even 100,000 subscribers or more.

The communication system 102 may be configured to communicate wirelessly in a frequency band (e.g. a license-free and/or approval-free frequency band, e.g. ISM band) that is used for communication by a plurality of communication systems. By way of example, one or two further communication systems 182 and 192 may be in range of the communication system 102—as indicated in FIG. 1—with respective subscribers (e.g. 186_1-186_4 and 196_1-196_4) and base stations (e.g. 184_1 and 194_1), the communication systems 102, 182 and 192 using the same frequency band for wireless communication and being uncoordinated.

Due to the large number of subscribers (density of subscribers) in the communication system 102, interference may occur between transmissions by different subscribers within the distinct communication system 102, e.g. if they happen to carry out transmissions on the same frequency simultaneously or at least at overlapping times. Furthermore, interference may occur between transmissions by subscribers in different communication systems, e.g. if they happen to carry out transmissions on the same frequency simultaneously or at least at overlapping times.

In other words, if the density of subscribers is at an appropriate level, terrestrial, wireless communication systems (e.g. mobile radio networks) are interference-limited, i.e. the network capacity is limited by co-channel interference, which arises as a result of users (e.g. subscribers) that are transmitting on the same frequency at the same time interfering with one another.

It is possible to distinguish between two types of interference sources in this case:

intracell interference IIntra arises in the same cell due to there being no orthogonality among the users. Causes may be for example nonideal properties of spreading and scrambling codes (as in the case of CDMA) or asynchronisms in the uplink when transmitting in the time domain and/or in the frequency domain.

Intercell interference IInter is caused by subscribers in adjacent cells that are likewise transmitting on the same frequency.

Both intracell and intercell interference lead to a decrease in transmission quality and hence to a reduction in cell capacity. A gauge used for quality is the carrier-to-interference ratio CIR. The higher the CIR, the better the connection quality. The basis for any radio-network or radio-coverage scheduling is the ratio CIRmin, which is a minimum requirement in order to ensure a demanded packet error rate. In order to reduce the interfering influence of interference power, there are a series of measures [7, 9], which are explained briefly below.

First, increasing the useful power C received at the base station:

antenna diversity: receiving and/or sending through two or more base station antennas at the same location with subsequent combination of the received signals.

macrodiversity/soft handover: covering a mobile station from multiple base station locations with combination of the respective signals.

power-controlled cell allocation: assigning the subscriber to the cell with the best reception level.

Second, decreasing the noise power:

discontinuous transmission (DTX): switching off the transmitter for pauses.

power control: decreasing the transmission power when reception conditions are good.

sectorization of cells: covering multiple cells from one location by using sector antennas with beam angles of from e.g. 65° to 120° instead of an omnidirectional antenna.

higher-quality modulation methods or adaptive channel coding: matching the resistance to noise to the reception level; if the reception level is better, higher modulation efficiency and lower coding protection.

increasing the cluster size (frequency reuse): increasing the frequency reuse spacing D as the smallest geometric spacing between the centers of two cells in which the same carrier frequencies are used.

hierarchic cell structures: radio network structure with macrocells (wide-area coverage) and microcells (for area with high traffic load). The macrocells and microcells have different base station sites.

Third, averaging the noise power/the CIR:

frequency hopping: changing frequency from data block to data block.

underlay-overlay cell structure: dividing the cell into annular areas with different frequency reuse spacings.

The interference-reducing and therefore capacity-increasing measures presented above have considerable associated additional costs, however, a circumstance that needs to be considered particularly precisely for a cost-efficient IOT system especially.

The discussion below considers a digital communication system (radio transmission system) in which the subscribers (e.g. sensor nodes or actuator nodes) transmit data packets, the receiving base station not knowing in advance which subscriber is active at what time and on what radio frequency in each instance. Due to there being no user orthogonality, there is always intracell interference IIntra in such a communication system using competitive methods (contention-based random access scheme) that involve data being sent proactively by the transmitter and without prior grant, or allocation, of dedicated radio resources (scheduling) by a coordinating entity (e.g. base station). Depending on the cluster size K taken as a basis for the frequency scheduling, intercell interference IInter additionally arises. The lower K is, the more the network capacity increases, but intercell interference also increases accordingly.

Figure 2A:
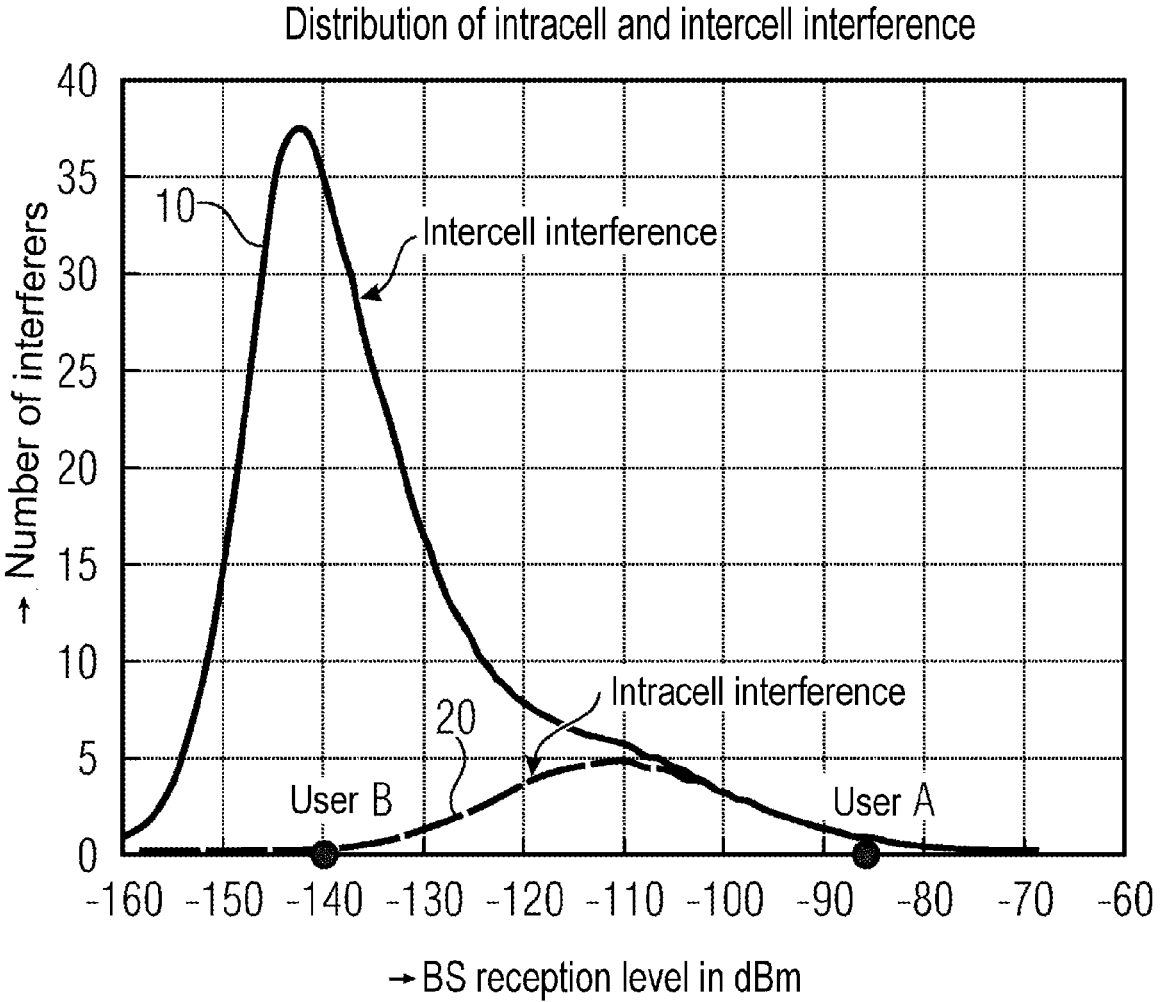
FIG. 2a is a graph of a distribution of intracell and intercell interference for a cluster size of K=7.
Figure 2B:
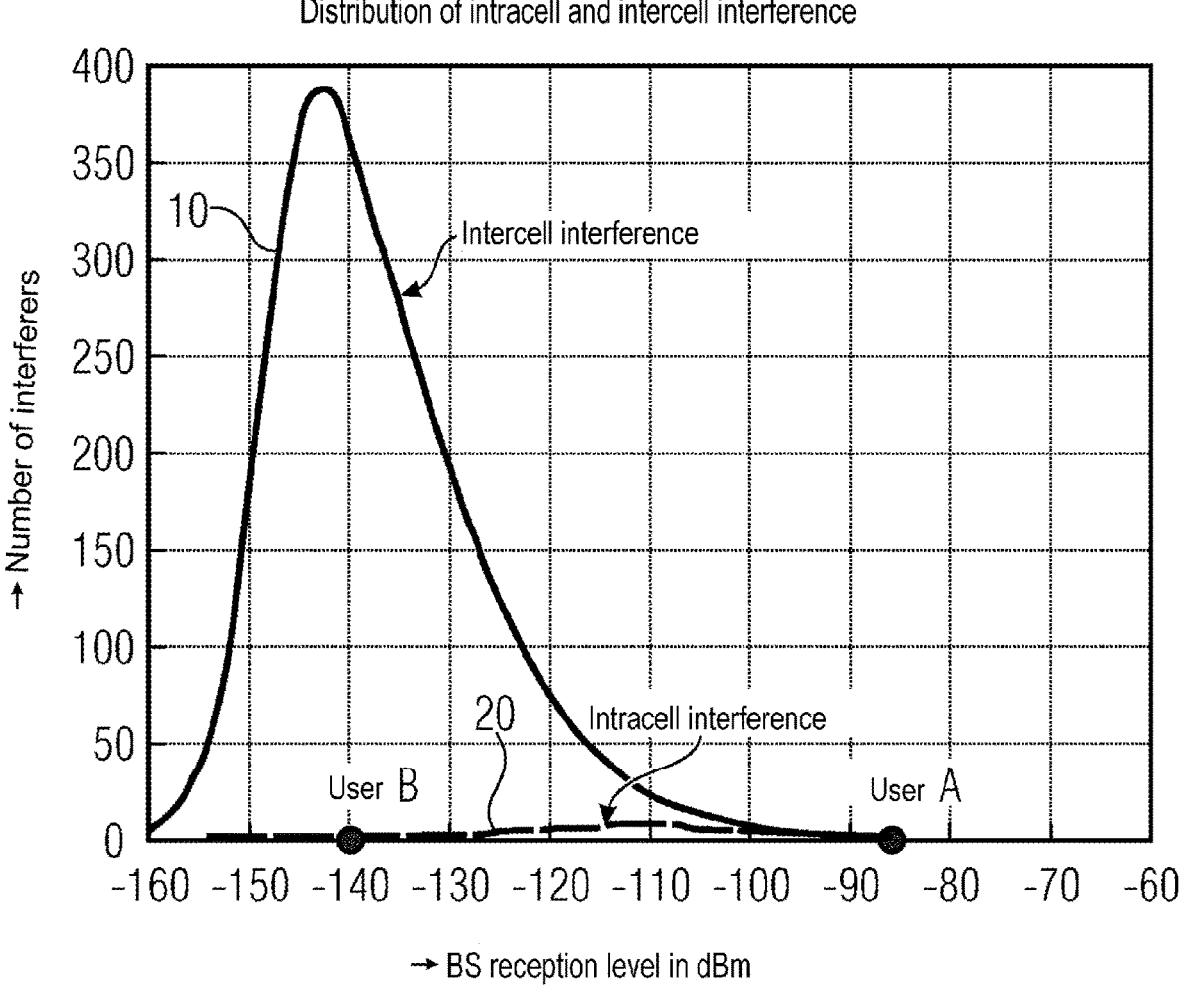
FIG. 2b is a graph of a distribution of intracell and intercell interference for a cluster size of K=1.

This will be illustrated by way of example in FIGS. 2a and 2b. In detail, FIGS. 2a and 2b show distributions of intercell interference 10 and intracell interference 20, and for a cluster size of K=7 in the case of FIG. 2a and a cluster size of K=1 in the case of FIG. 2b. In this case, the ordinates describe the respective number of interferers, while the abscissae describe the respective reception level at the base station in dBm.

In other words, FIGS. 2a and 2b show the distribution functions of the various reception levels of intracell interference 20 and intercell interference 10. In FIG. 2a, the cluster size is K=7, that is to say that only every 7th radio cell contributes to the intercell interference 10. The co-channel interferers (curve 10 in FIG. 2a) from the adjacent cells turn out to be correspondingly low in comparison with the interfering users in the distinct cell (curve 20 in FIG. 2a). In FIG. 2b, where the cluster size is K=1 (all of the radio cells use the same frequency), a different ratio of intracell interference 20 to intercell interference 10 is obtained. The smaller cluster size of K=1 means that there are effectively fewer interfering users in the distinct cell, but instead more co-channel interferers in the adjacent cells. Which cluster configuration yields the higher data throughput cannot be assessed as easily, since it is dependent on many factors, such as for example the radio propagation, the radio transmission and the signal processing in the receiver.

In FIGS. 2a and 2b, particularly the user distributions in the distinct user cell are significant, that is to say the curves 20. Due to the different physical distance of the individual subscribers (e.g. sensors) from the receiving base station, the so-called "near-far effect" may be observed. A user (e.g. sensor node) (user A) that is very close to the BS will normally have low path loss and its reception level CA at the BS will turn out to be correspondingly high (FIGS. 2a and 2b for example in the range from −90 dBm to −60 dBm). By contrast, a user (e.g. sensor node) that is further away (user B) shows greater path loss and its reception level CB at the base station will turn out to be correspondingly low (FIGS. 2a and 2b for example in the range from −150 dBm to −120 dBm).

Figure 3:
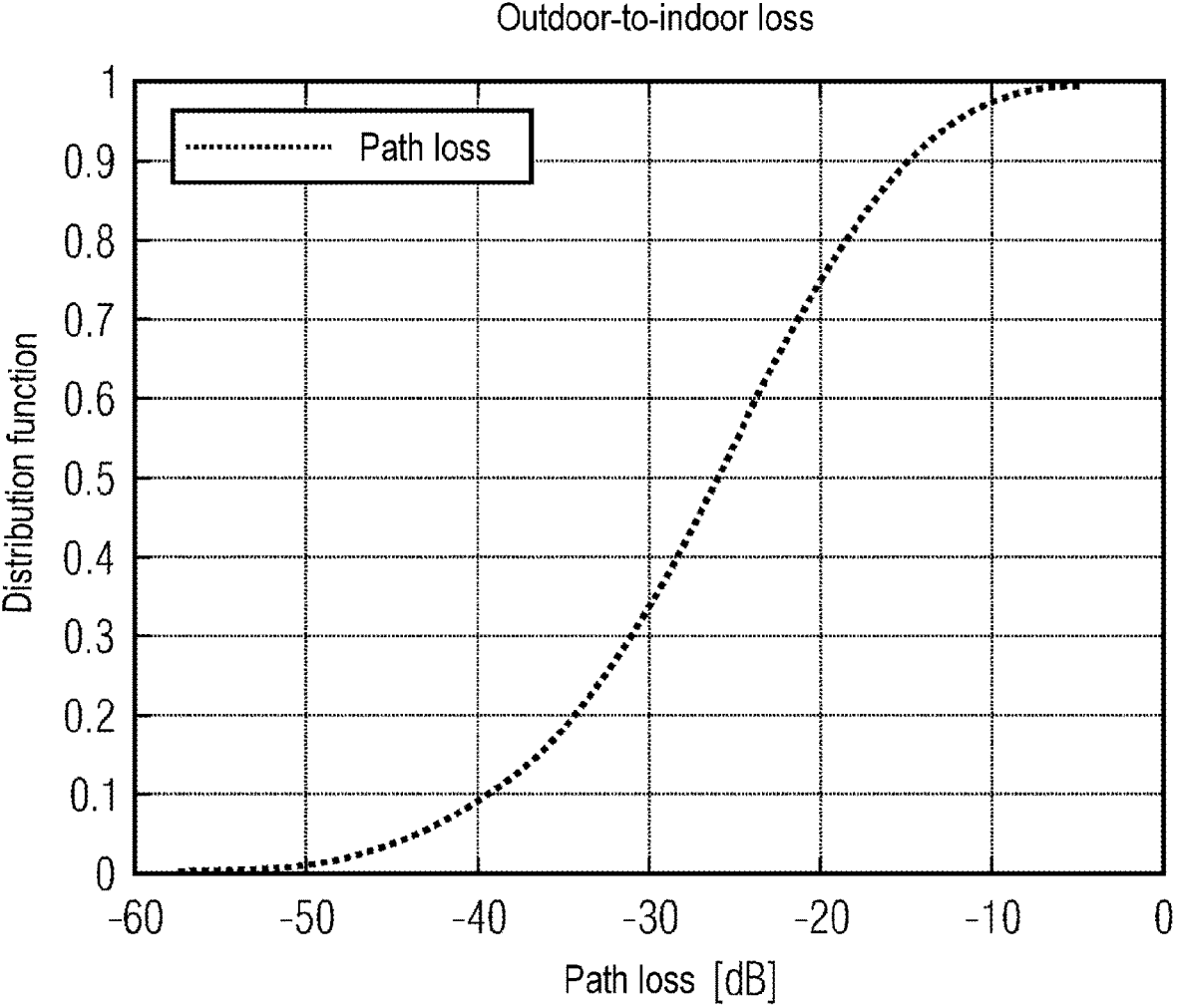
FIG. 3 is a graph of a distribution function of the outdoor-to-indoor path loss in accordance with the so-called "building penetration loss" channel model based on the COST 231 NLOS model.

The path losses in the case of the so-called "building penetration loss" channel model [1, 10], which is used in 3GPP, based on the COST 231 NLOS (NLOS=non-line-of-sight) outdoor-to-indoor propagation model [11] are particularly high. In the case of this channel model, the transition from the building interior to the open air is modelled and distance-independent path losses of over 50 dB may occur. FIG. 3 shows the distribution function (CDF, cumulative distribution function) of the outdoor-to-indoor path loss in accordance with the so-called "building penetration loss" channel model based on the COST 231 NLOS model. In this case, the ordinate describes the distribution function (CDF, cumulative distribution function) and the abscissa describes the path losses in dB.

It is therefore obvious that user A (with the low path loss) has a correspondingly high CIRA and user B has a correspondingly low CIRB. Especially the sensor nodes with the greatest path losses and therefore the lowest CIRs determine the quality of service QoS of a mobile radio network, however. QoS represents a multiplicity of quality requirements that include influencing variables such as packet loss rate and latency, inter alia [2].

Figure 4:
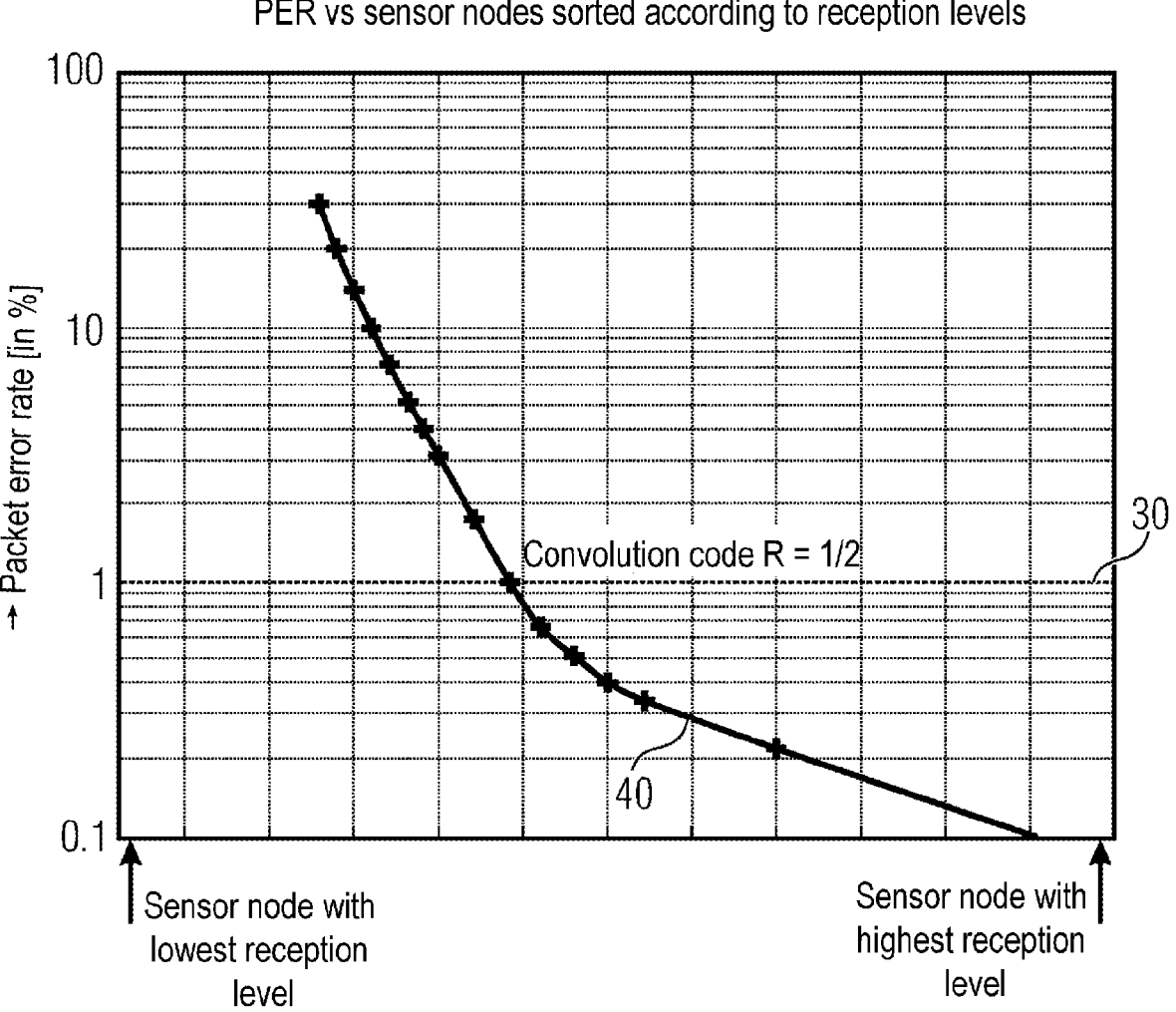
FIG. 4 is a graph of the packet error rate plotted over the subscribers (e.g. sensor nodes) of a radio cell, which are sorted on the basis of their reception levels.

FIG. 4 shows an exemplary example in this regard. In detail, FIG. 4 shows a graph of the packet error rate 40, PER, plotted over the subscribers (e.g. sensor nodes) in a radio cell, which are sorted on the basis of their reception levels. On the far left is the subscriber that arrives at the base station with the lowest reception level, or CIR, and has a correspondingly high packet error rate. On the far right are the subscribers with the highest CIRs and a correspondingly low packet error rate.

If for example a packet error rate of 1% is now defined as a quality requirement 30 for all subscribers present in the cell, it becomes clear that a specific number of nodes (approximately 40% of all subscribers in FIG. 4) do not meet this requirement. The subscribers with very low reception levels have packet error rates of greater than 30%, for example.

Figure 5:
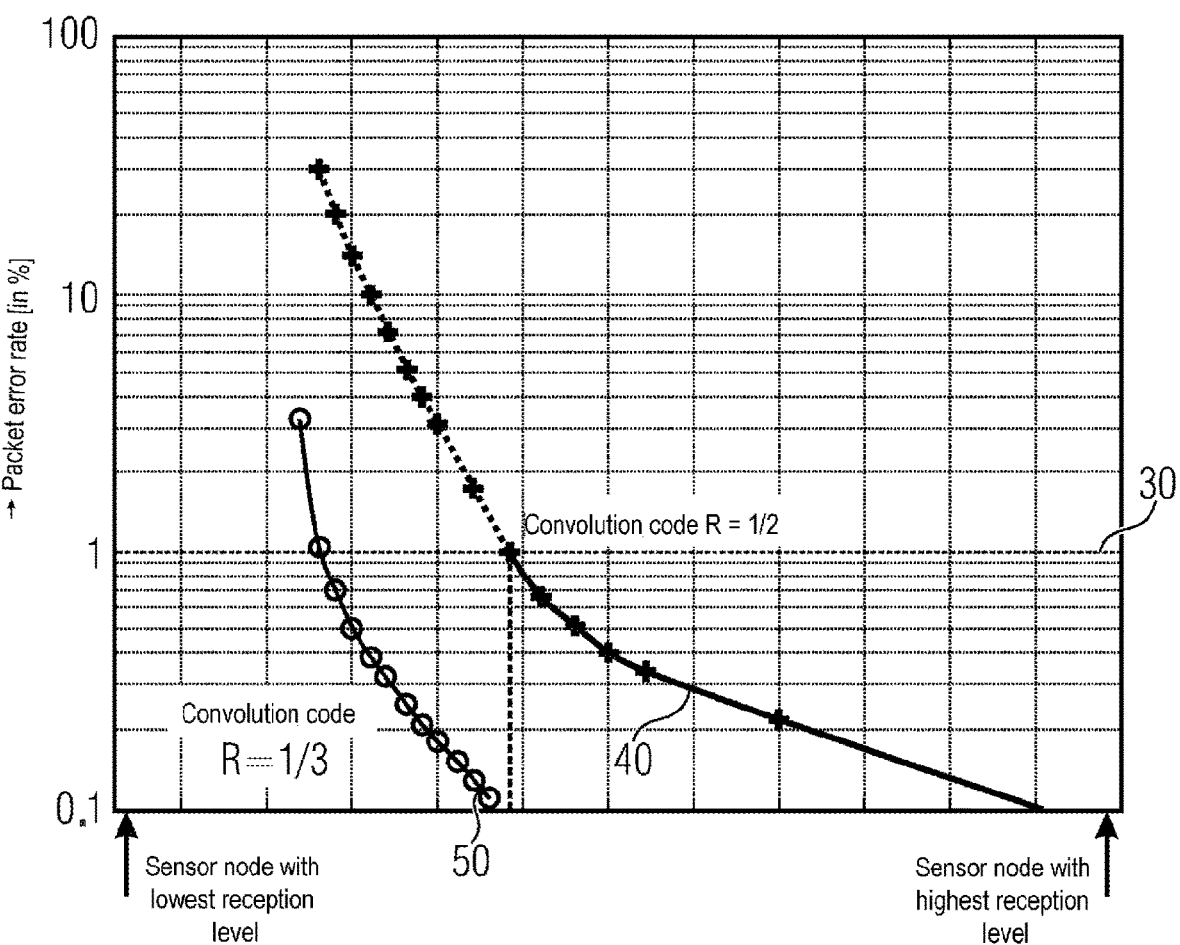
FIG. 5 is a graph of the packet error rates plotted over the sensor nodes sorted on the basis of their reception level, and use of adaptive channel coding with the rates ½ and ⅓.

Some measures described above may now be used to attempt to bring more subscribers below the PER threshold of 1%. If for example adaptive channel coding is used, then the subscribers with the lower reception levels may use better-protected convolution coding. This will be shown schematically in FIG. 5. In detail, FIG. 5 shows a graph of packet error rates 40 and 50 plotted over the sensor nodes sorted on the basis of their reception level, and use of adaptive channel coding with the rates ½ and ⅓. By way of illustration, the packet error rate 40 already known from FIG. 4 uses a convolution code with the rate ½, whereas a convolution code with the rate⅓ is used by way of illustration for the packet error rate 50. That is to say that if a better-protected code is used for the subscribers with the low reception levels, then significantly more subscribers in comparison with FIG. 3 can be pushed below the PER threshold 30 of 1%. The detailed manner in which the code rate adaptation for the individual subscribers may be performed will be explained later on.

All in all, however, it may be stated that the known measures for increasing cell capacity often reach their limits very quickly, since they are often too complex and thus cost-intensive for a simple IOT system.

The text below therefore describes exemplary embodiments that increase the probability of getting through for subscribers with poor reception conditions or high QoS requirements in communication systems with a high density of subscribers.

Figure 6:
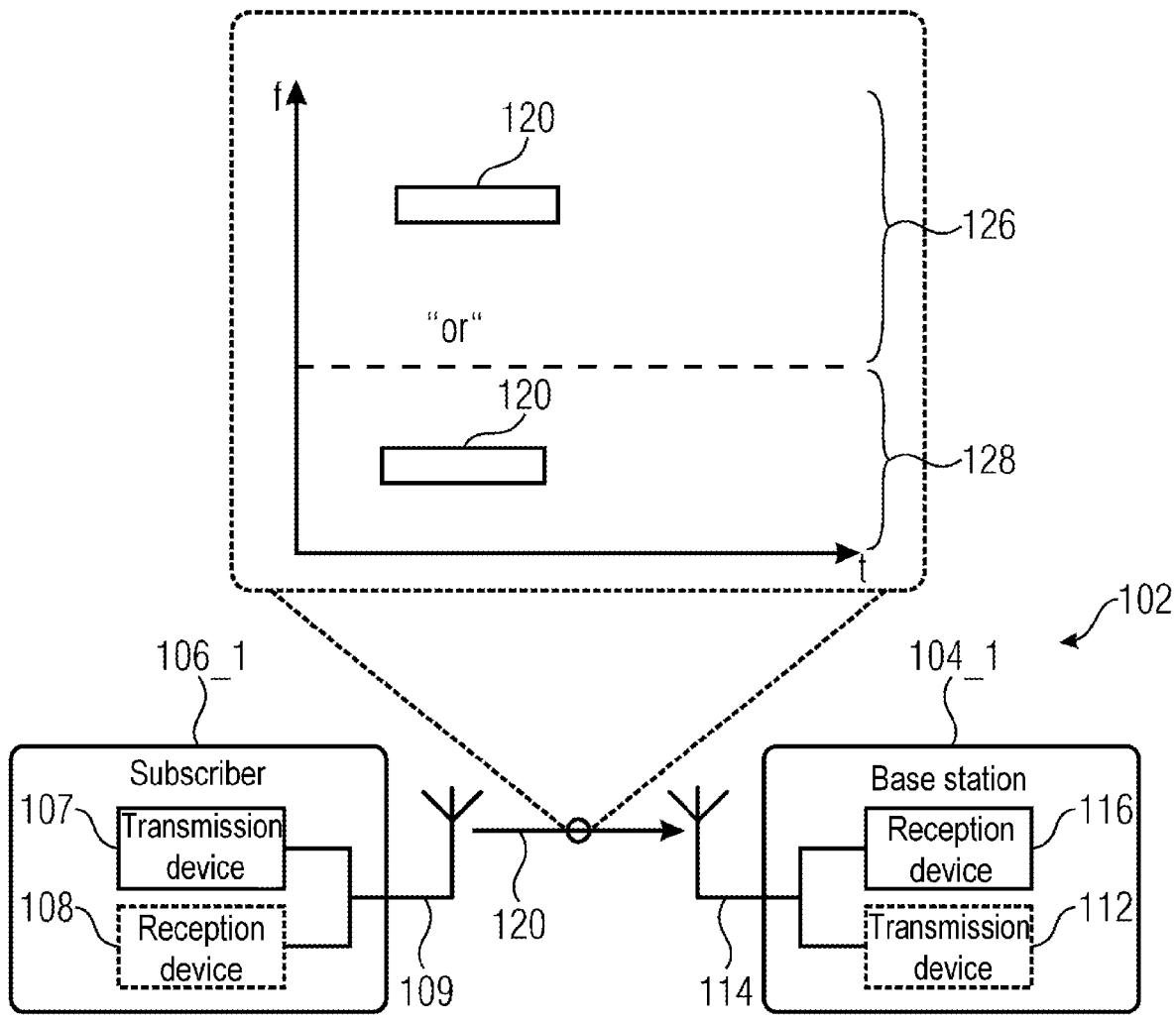
FIG. 6 is a schematic block diagram of a communication system with a base station and a subscriber, according to an exemplary embodiment of the present invention.

1. Distinct Frequency Range for Subscribers with Permanently Poor Reception Conditions FIG. 6 shows a schematic block diagram of a communication system 102 with a base station 104_1 and a subscriber 106_1, according to an exemplary embodiment of the present invention. Although only one subscriber 106_1 is shown in FIG. 6 for reasons of clarity, it will be pointed out that the communication system 102 may, in exemplary embodiments, include a multiplicity of (e.g. uncoordinated) subscribers 106_1-106_n, such as e.g. 10, 100, 1000, 10,000 or even 100,000 subscribers or more (cf. FIG. 1). Furthermore, it is possible for the communication system 102 to also include more than one base station. By way of example, the communication system 102 may include at least two base stations 104_1-104_m, each of the base stations 104_1-104_m being able to have an associated radio cell.

The subscriber 106_1 is configured to send data 120 to the base station 104_1 in the communication system 102, wherein the subscriber 106_1 is configured to take a quality criterion of at least one preceding transmission between the subscriber 106_1 and the base station 104_1 as a basis for transmitting the data 120 in a first frequency range 126, or in a second frequency range 128, the first frequency range 126 and the second frequency range 128 being different.

The base station 104_1 is configured to receive the data 120 sent by the subscriber 106_1, wherein a quality criterion of at least one preceding transmission between the subscriber 106_1 and the base station 104 is taken as a basis for transmitting the data 120 in the first frequency range 126, or in the second frequency range 128, the first frequency range 126 and the second frequency range 128 being different.

In exemplary embodiments, the first frequency range 126 and the second frequency range 128 may adjoin one another (see FIG. 6) or be spaced apart from one another.

The quality criterion of the at least one preceding transmission between the subscriber 106_1 and the base station 104_1 may be for example at least one from a reception level of the at least one preceding transmission, a bit error rate of the at least one preceding transmission, a block error rate of the at least one preceding transmission, a packet error rate of the at least one preceding transmission, a signal-to-noise ratio of the at least one preceding transmission, a signal-to-interference ratio of the at least one preceding transmission, in the case of multiple preceding transmissions, a ratio between a number of detected transmissions and a number of undetected transmissions.

As such, in exemplary embodiments, the data 120 may be transmitted in the first frequency range 126 if the quality criterion is in a first quality criterion range, e.g. if the reception level is in a first reception level range (e.g. 0 to −115 dBm), or if the quality criterion is greater than or equal to a quality criterion threshold, e.g. if the reception level is greater than or equal to a reception level threshold (e.g. −115 dBm).

Accordingly, in exemplary embodiments, the data 120 may be transmitted in the second frequency range 128 if the quality criterion is in a second quality criterion range, e.g. if the reception level is in a second reception level range (e.g. −115 dBm to −∞), or if the quality criterion is less than the quality criterion threshold, e.g. if the reception level is less than the reception level threshold (e.g. −115 dBm).

In exemplary embodiments, the data 120 may naturally also be transmitted in more than two different frequency ranges on the basis of the quality criterion, such as e.g. in three, four or five frequency ranges, each of which has a respective associated quality criterion range, or which are each separated by respective quality criterion thresholds.

In exemplary embodiments, the at least one preceding transmission may be a transmission (e.g. downlink data transmission or beacon transmission) from the base station 104_1 to the subscriber 106_1. In this case, the subscriber 106_1 may ascertain the quality criterion of the at least one preceding transmission itself, i.e. on the basis of the received transmission from the base station 104_1.

In exemplary embodiments, the at least one preceding transmission may be a transmission (e.g. uplink data transmission) from the subscriber 106_1 to the base station 104_1. In this case, the base station 104_1 may ascertain the quality criterion on the basis of the received transmission from the subscriber 106_1 and may send a data transmission (e.g. downlink data transmission) to the subscriber 106_1, the data transmission to the subscriber 106_1 including information about the quality criterion.

In exemplary embodiments, the subscriber 106_1 may include a transmission device (or transmission module, or transmitter) 107 that is configured to send a transmission (e.g. an uplink data transmission). The transmission device 107 may be connected to an antenna 109 of the subscriber 106_1. Optionally, the subscriber 106_1 may include a reception device (or reception module, or receiver) 108 that is configured to receive a transmission. The reception device 108 may be connected to the antenna 109 or to a further (separate) antenna of the subscriber 106_1. The subscriber 106_1 may also include a combined transmission/reception device (transceiver).

In exemplary embodiments, the base station 104_1 may include a reception device (or reception module, or receiver) 116 that is configured to receive a transmission (e.g. uplink data transmission). The reception device 116 may be connected to an antenna 114 of the base station 104_1. Optionally, the base station 104_1 may include a transmission device (or transmission module, or transmitter) 112 that is configured to send a transmission (e.g. downlink data transmission or beacon transmission). The transmission device 112 may be connected to the antenna 114 or to a further (separate) antenna of the base station 104_1. The base station 104_1 may also include a combined transmission/reception device (transceiver).

In exemplary embodiments, the subscriber 106_1 and the base station 104_1 may be configured to transmit data on the basis of the so-called telegram splitting method [3], as defined in ETSI TS 103 357, for example. In this case, the data (e.g. a data packet containing the data) are split into a plurality of partial data packets (so-called radio bursts) at the transmitter end, and the partial data packets are transmitted in a manner distributed over time and/or frequency in accordance with a hopping pattern, the partial data packets being assembled (or combined) again at the receiver end in order to obtain the original data. Each of the partial data packets contains only some of the data that are to be transmitted. The partial data packets may furthermore be channel-coded, which means that correct decoding of the data requires not all of the partial data packets but rather only some of the partial data packets.

The plurality of partial data packets may, as already mentioned, be distributed over time in accordance with a time and/or frequency hopping pattern.

A time hopping pattern may indicate a succession of transmission times or transmission intervals that are used to send the partial data packets. By way of example, a first partial data packet may be sent at a first transmission time (or in a first transmission time slot) and a second partial data packet may be sent at a second transmission time (or in a second transmission time slot), the first transmission time and the second transmission time being different. The time hopping pattern may define (or predetermine, or indicate) the first transmission time and the second transmission time. Alternatively, the time hopping pattern may indicate the first transmission time and an interval of time between the first transmission time and the second transmission time. The time hopping pattern may naturally also indicate just the interval of time between the first time and the second transmission time. Between the partial data packets, there may be transmission pauses in which transmission does not take place. The partial data packets may also overlap (coincide) in time.

A frequency hopping pattern may indicate a succession of transmission frequencies or transmission frequency hops that are used to send the partial data packets. By way of example, a first partial data packet may be sent at a first transmission frequency (or in a first frequency channel) and a second partial data packet may be sent at a second transmission frequency (or in a second frequency channel), the first transmission frequency and the second transmission frequency being different. The frequency hopping pattern may define (or predetermine, or indicate) the first transmission frequency and the second transmission frequency.

Alternatively, the frequency hopping pattern may indicate the first transmission frequency and a frequency spacing (transmission frequency hop) between the first transmission frequency and the second transmission frequency. The frequency hopping pattern may naturally also indicate just the frequency spacing (transmission frequency hop) between the first transmission frequency and the second transmission frequency.

The plurality of partial data packets may naturally also be transmitted with both a time and a frequency distribution. The plurality of partial data packets may be distributed over time and over frequency in accordance with a time and frequency hopping pattern, which is the combination of a time hopping pattern and a frequency hopping pattern, i.e. a succession of transmission times or transmission intervals that are used to transmit the partial data packets, the transmission times (or transmission intervals) having associated transmission frequencies (or transmission frequency hops).

Figure 7:
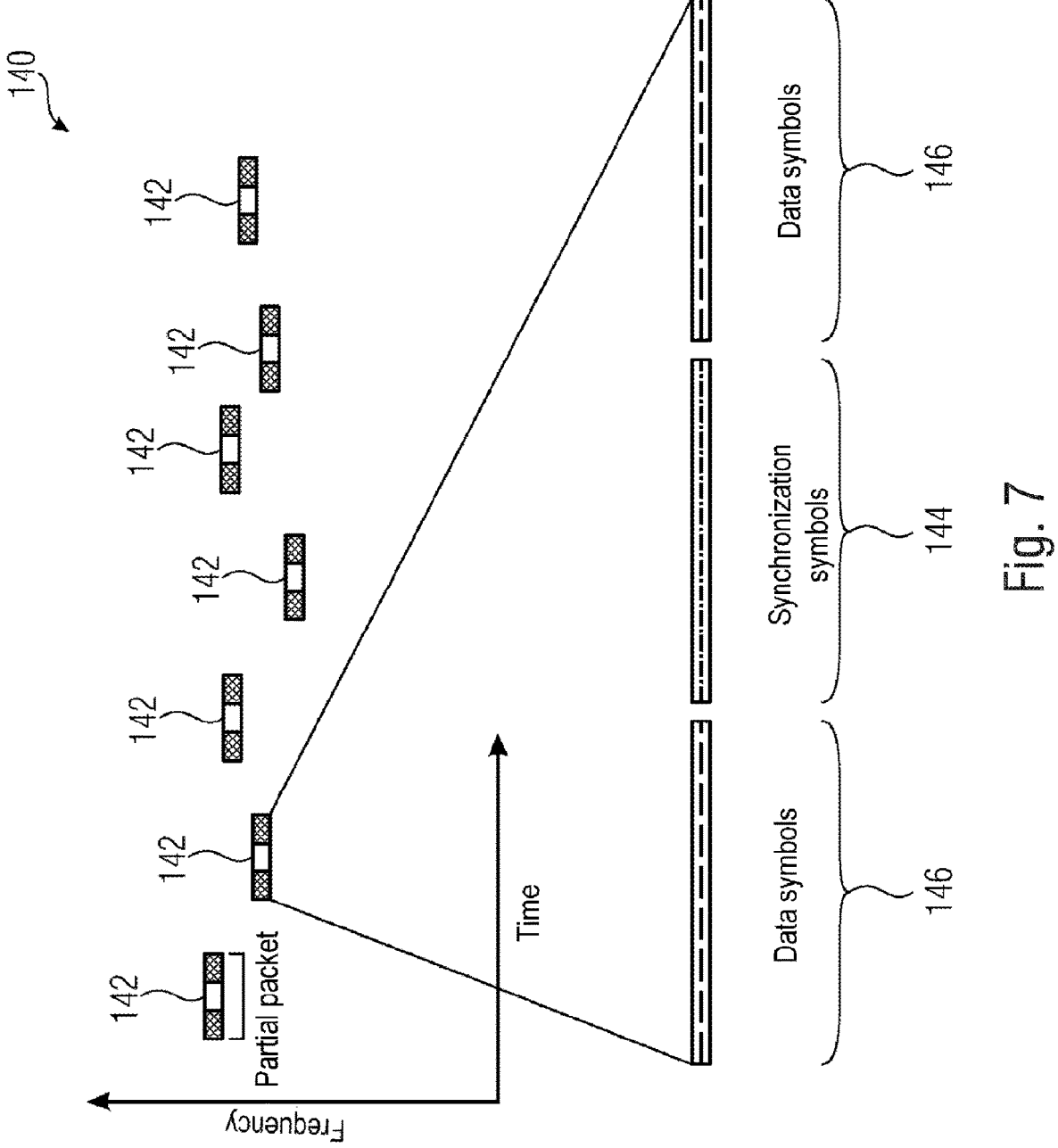
FIG. 7 is a graph of a use of the transmission channel for transmitting a plurality of partial data packets in accordance with a hopping pattern (time and frequency hopping pattern)

FIG. 7 shows a graph of a use of the transmission channel for transmitting a plurality of partial data packets 142 in accordance with a hopping pattern (time and frequency hopping pattern) 140. The ordinate describes the frequency and the abscissa describes the time.

As may be seen in FIG. 7, the data (e.g. a data packet containing the data) may be split into, by way of illustration, n=7 partial data packets 142 and transmitted with a time and frequency distribution in accordance with a hopping pattern 140.

As may also be seen in FIG. 7, the plurality of partial data packets 142 may contain not only data (data symbols 146 in FIG. 7) but also pilot sequences (pilot symbols (or synchronization symbols) 144 in FIG. 7), on the basis of which the partial data packets 142 in a received signal 120 or received data stream may be detected at the receiver end.

Based on FIG. 6, in exemplary embodiments, depending on the quality criterion, the data 120 may be transmitted in the first frequency range 126 or the second frequency range 128 in accordance with a hopping pattern 140 (time hopping pattern, frequency hopping pattern or time and frequency hopping pattern).

Optionally, different hopping patterns may be used for transmitting the data 120 in the different frequency ranges 126 and 128. As such, the data 120 may be transmitted in the first frequency range 126 in accordance with a first hopping pattern, while the data 120 may be transmitted in the second frequency range 128 in accordance with a second hopping pattern, the first hopping pattern and the second hopping pattern being different.

Optionally, the different frequency ranges 126 and 128 may also have different associated groups of hopping patterns. As such, the first frequency range 126 may have a first associated group of hopping patterns, while the second frequency range 128 may have a second associated group of hopping patterns, one hopping pattern from the respective group of hopping patterns accordingly being used for transmitting the data.

Detailed exemplary embodiments of the communication system 102 shown in FIG. 6 are described in more detail below.

The discussion below is based, by way of illustration, on a communication system 102 that involves the data packets being sent proactively by the subscribers 106_1-106_n (e.g. transmitters) using a competitive method, the transmission times not being assigned in advance (contention-based random access). Furthermore, it is assumed that the subscribers (e.g. transmitters) are fixed, i.e. without relevant movement within the radio cell. It may therefore be assumed that the path loss of the radio propagation from each subscriber (e.g. transmitter) to the particular associated base station is approximately time-invariant. The reception level of a subscriber (e.g. transmitter) at the base station is therefore approximately constant.

In exemplary embodiments, all of the subscribers (e.g. sensor nodes) 106_1-106_n in a radio cell whose quality criterion (e.g. reception level) is below a predeterminable quality criterion threshold (e.g. level threshold, such as e.g. X dBm) may be provided with a distinct frequency range 126 and 128. In each radio cell, all of the subscribers (e.g. sensor nodes) 106_1-106_n present in the radio cell are therefore split into e.g. two different frequency ranges (subsequently referred to as "lower" and "upper" frequency range for the sake of simplicity), the bandwidths thereof being able to be quite different. Unlike in the case of the underlay-overlay cell structure arrangement (see above), the two frequency ranges 126 and 128 are covered by the same base station 104_1 and also geometrically cover the same cell area.

Figure 8:
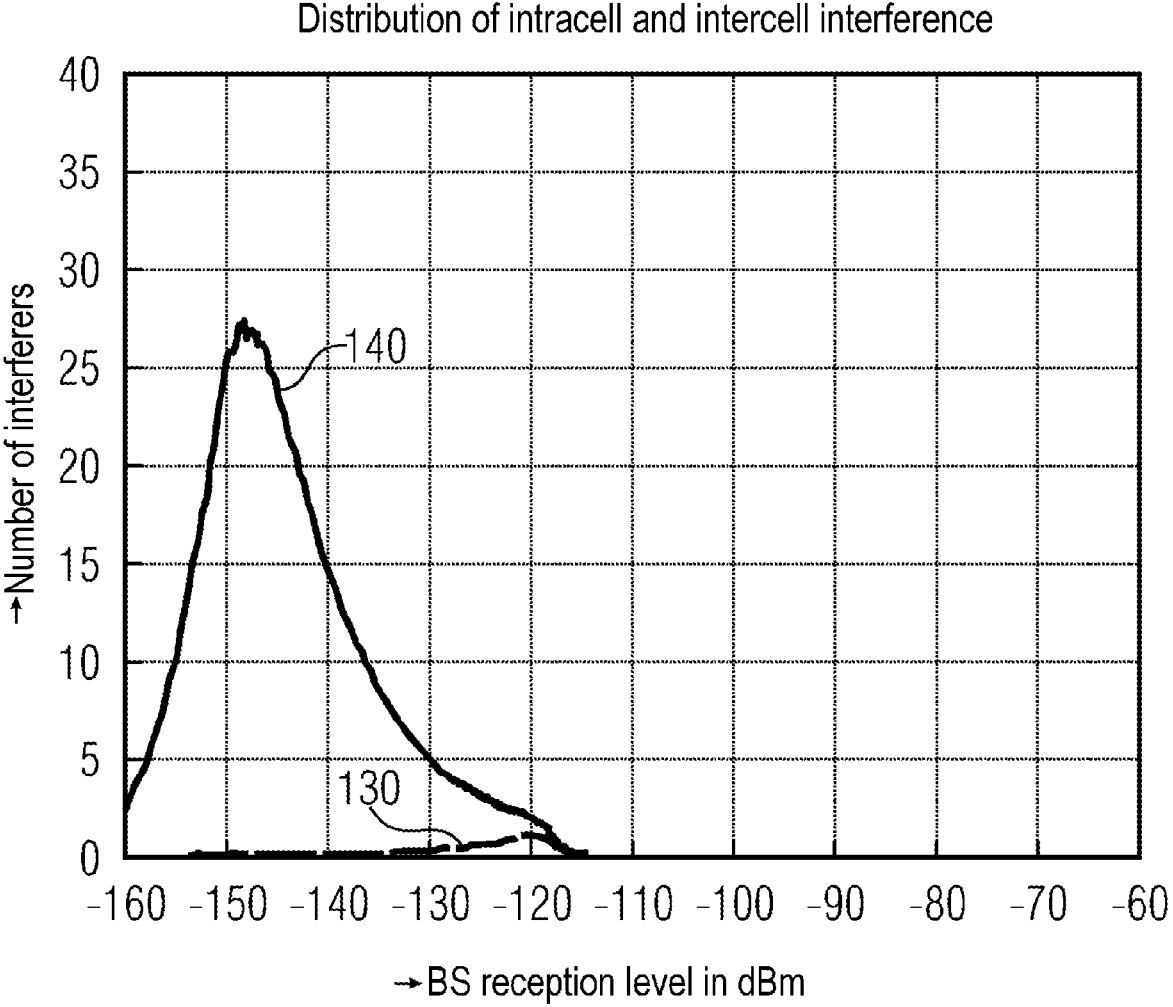
FIG. 8 is a graph of a distribution of intracell interference and intercell interference for those subscribers that, due to their reception power, as a quality criterion, being below a reception power threshold, by way of illustration, transmit data in the distinct (lower) frequency range, for a cluster size of K=1.

FIG. 8 shows a graph of a distribution of intracell interference 130 and intercell interference 140 for those subscribers that, due to their reception power, as a quality criterion, being below a reception power threshold, by way of illustration, transmit data in the distinct (lower) frequency range, for a cluster size of K=1. The ordinate describes the number of interferers and the abscissa describes the base station reception level in dBm.

FIG. 8 illustrates the splitting off of the weakest subscribers (e.g. sensor nodes) into a distinct frequency range 128. From the distribution of the curve 130, it may clearly be seen that now only subscribers below a quality criterion threshold (e.g. with a reception power of less than −115 dBm) in the distinct radio cell are in the lower frequency range 128 (see FIGS. 2a and 2b for comparison). Since such splitting may also take place in all of the other adjacent radio cells, a distribution that does not start until below the quality criterion threshold (e.g. the threshold value X of −115 dBm) is likewise obtained for the intercell interference from the adjacent cells. If the distribution of the intercell interference from FIG. 8 is compared with that from FIG. 2b, it is clearly evident that now only the weakest interferers from the adjacent cells have remained in this frequency range. A distinctly more favorable CIR is obtained for each individual subscriber in this lower frequency range 128 after the split.

When dimensioning the two frequency ranges 126 and 128 to be split into a lower frequency range (with bandwidth bu for the subscribers below the quality criterion threshold (e.g. subscribers with the weakest reception)) and an upper frequency range (with bandwidth bo), it may make sense to take multiples of the system base bandwidth b as a starting point. In the case of GSM, this bandwidth is b=200 kHz, and in the case of the IoT method called "telegram splitting multiple access" (TSMA) [3, 4, 5, 6] it is b=100 kHz. Normally, the bandwidth ratio of bu/bo should be in the range between⅓ and 1. This can be justified by the greater sensitivity of the subscribers (e.g. sensor nodes) with weaker reception toward interference. The variation in the reception levels should not be too great in the lower band 128. Since it is furthermore desirable to produce an approximately identical volume of traffic in both bands bu and bo (126 and 128), the relative threshold X should preferably be approximately bu/bo 50%.

Figure 9:
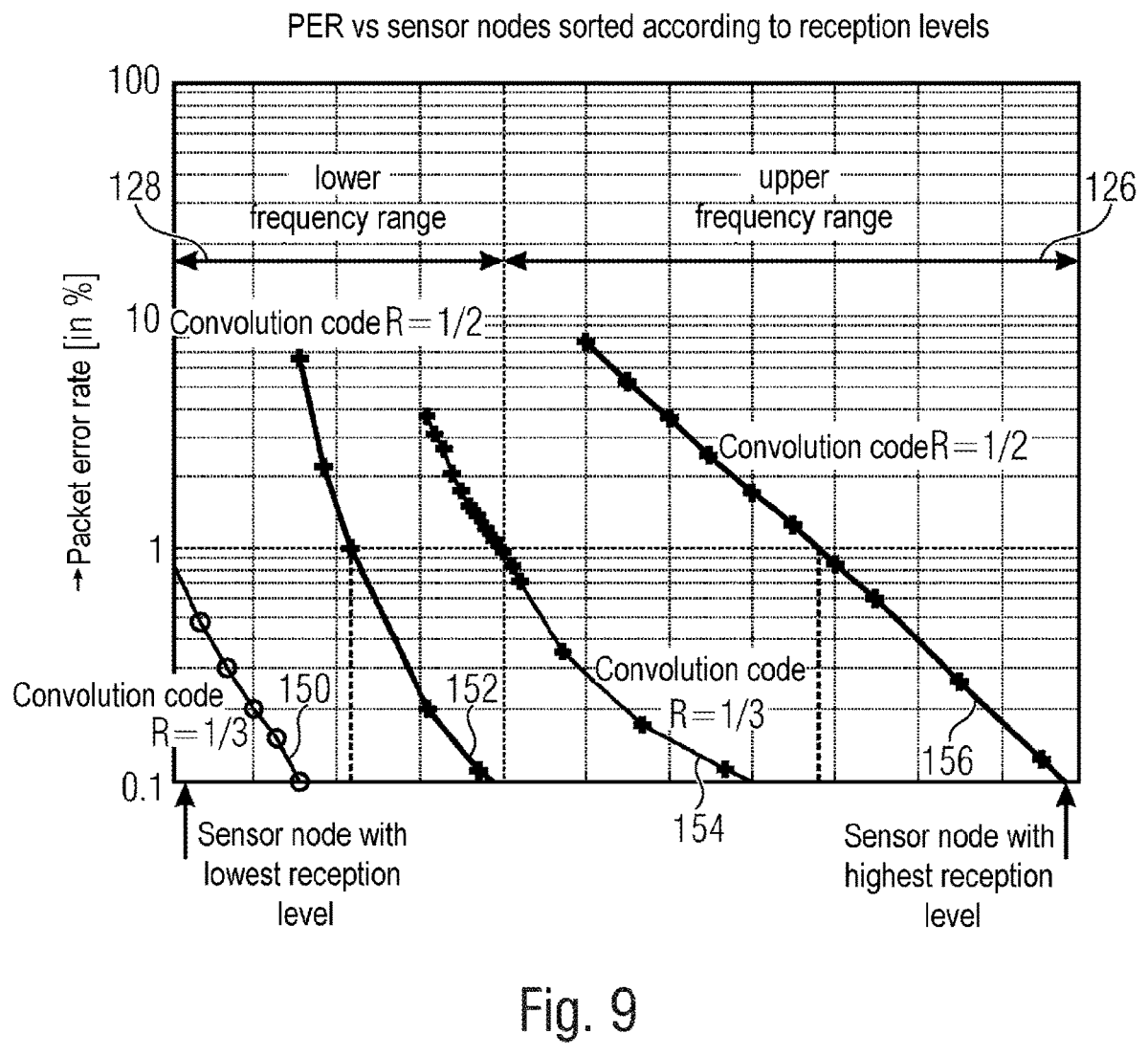

FIG. 9 shows a graph of packet error rates for different convolution codes with the rates ½ and ⅓ over the subscribers sorted on the basis of their reception levels, as a quality criterion, by way of illustration, when two separate frequency ranges 126 and 128 are used. The ordinate describes the packet error rate as a percentage and the abscissa describes the reception level. In FIG. 9, a first curve 150 describes a packet error rate for a convolution code with the rate ⅓ for subscribers in the lower frequency range 128, a second curve 152 describes a packet error rate for a convolution code with the rate ½ for subscribers in the lower frequency range 128, a third curve 154 describes a packet error rate for a convolution code with the rate ⅓ for subscribers in the upper frequency range 126, and a fourth curve 156 describes a packet error rate for a convolution code with the rate ½ for subscribers in the upper frequency range 126.

In other words, FIG. 9 shows, by way of example, the effect of the splitting of the subscribers (e.g. sensor nodes) into the two frequency ranges 126 and 128 that is performed in accordance with their reception levels. In the case of the lower frequency range 128, a significant reduction in interference power I takes place, which ultimately leads to a distinctly more favorable distribution of the CIRs. Since no further consideration is given to the performance of the omitted subscribers (e.g. sensor nodes) with the low reception levels in the upper frequency range 126, the total number of subscribers may be significantly increased, which leads to a significant increase in spectral capacity. According to [7], spectral capacity is understood to mean the maximum traffic (in kbit/s) per surface area and per bandwidth that can be covered for a demanded QoS.

Separate use of the two frequency ranges 126 and 128 thus allows a much higher spectral capacity to be attained than if the two frequency ranges 126 and 128 are shared by all subscribers (e.g. users).

At this juncture, it will be pointed out that all of the subscribers present in the cell may also be split into more than the two different frequency ranges.

In some exemplary embodiments, a subscriber may make the correct selection as regards the two frequency ranges 126 and 128 as described below.

Figure 10:
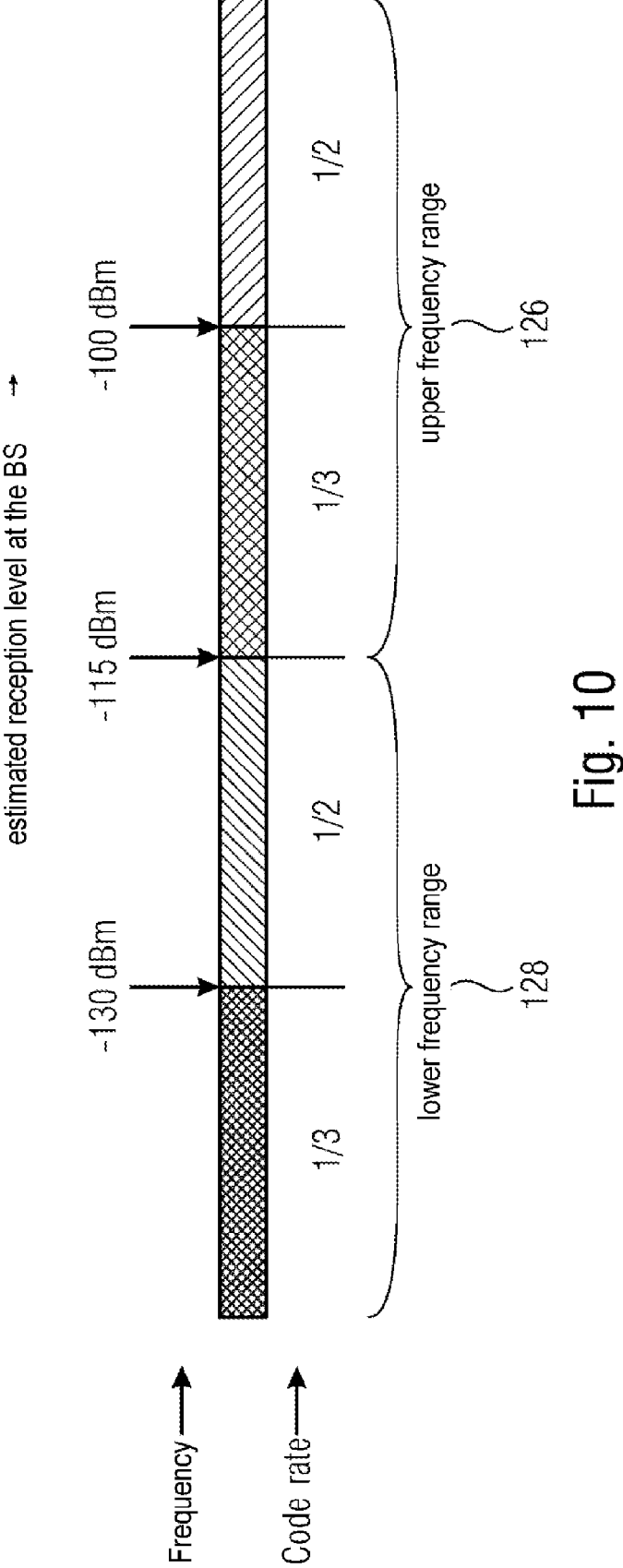
FIG. 10 is a tabular representation of an exemplary allocation scheme of the base station for code-rate and frequency-range allocation, according to an exemplary embodiment of the present invention.

The starting point is the base station 104_1. Within the respective radio cell, for example, the base station keeps statistics about the quality criteria (e.g. reception levels and the packet error rates, PER) of all of the subscribers (e.g. sensor nodes) 106_1-106_n that are in the radio cell. From these, the base station 104_1 is able to generate a table, for example, as shown graphically in FIG. 10, that allows association, using the example of the reception level as a quality criterion, with various code rates and also association of the frequency ranges 126 and 128. The table is adapted by the base station at regular intervals depending on the utilization level of the communication system 102 (and hence the interference situation). The subscriber 106_1 may for its part estimate the quality criterion (e.g. signal level) on the basis of a transmission (e.g. downlink data transmission or beacon transmission) received from the associated base station, and may take the estimated quality criterion as a basis for selecting the code rate for its transmissions and the association with the two frequency ranges 126 and 128 on the basis of the table. Initially, the subscriber (e.g. sensor node) 106_1 may always start in the lower frequency band 128 when first registering in the communication system.

So that the subscriber (e.g. sensor node) 106_1 is able to measure or estimate the quality criterion (e.g. signal level) of the transmission from the base station 104_1 and also obtains information about the table (e.g. the content of the table), a return channel from the base station 104_1 to the subscribers 106_1-106_n may be used. This return channel may be a distinct frequency band, which means that the spectral capacity decreases, however. In the case of a distinct return channel, the base station may also assign the code rate and the frequency band to the subscriber directly, for example by way of a link layer command.

The return channel may also be hidden in the uplink frequency channels in the form of a radio beacon as a so-called "partially coordinated system", however. As a result, an additional frequency band is not used. The base station 104_1 is able to transmit this radio beacon, which e.g. includes the level table as information, at e.g. regular intervals.

Possible exemplary embodiments regarding the splitting of the frequency ranges will be described below.

In the case of GSM and NB-IoT, the bandwidth b is 200 kHz in each case, whereas it is b=100 kHz in the case of the regular telegram splitting multiple access (TSMA) according to [4]. Since the information data rate R is much lower than the bandwidth b both in the case of NB-IoT and in the case of TSMA, a radio band may again be divided into b/R frequency channels. In the case of GSM, on the other hand, the modulation rate R is in the same order of magnitude as the minimum required bandwidth b.

Figure 11:
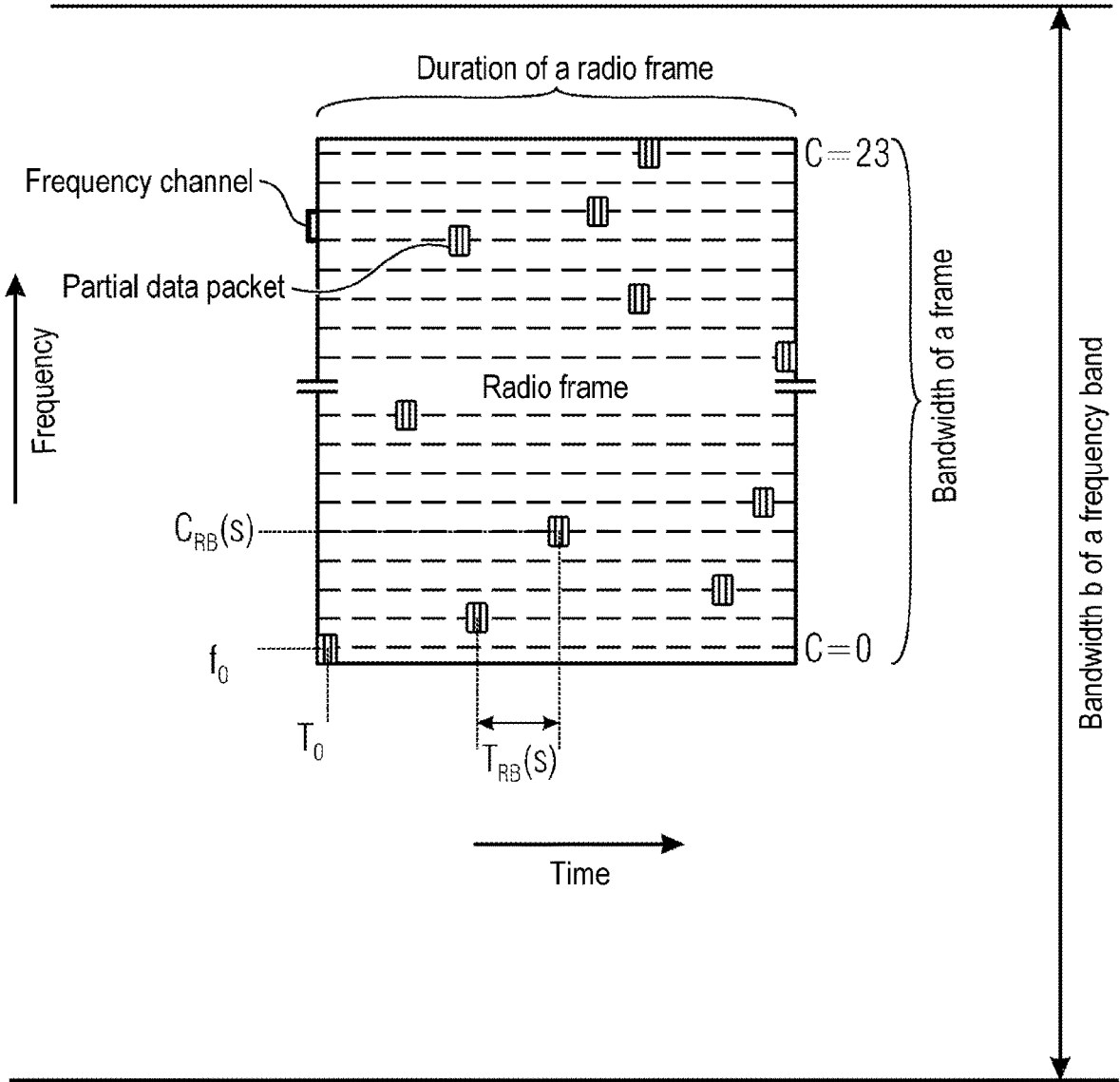
FIG. 11 is a schematic representation of a frame structure for TSMA with subcarriers within a frequency range.

1) If the bandwidth of the frequency-hopping-based frame (see FIG. 11) in the case of TSMA is less than half the bandwidth b, then the split into a lower and an upper band bu and bo may be made within a radio band of for example 100 kHz already.

2) The use of two or more radio bands for the different frequency allocation of the two bands bu and bo is always possible. The two bands may be next one another, but do not have to be.

2. Distinct Time Interval for Subscribers (e.g. Sensor Nodes) with Permanently Poor Reception Conditions FIG. 12 shows a schematic block diagram of a communication system 102 with a base station 104_1 and a subscriber 106_1, according to a further exemplary embodiment of the present invention.

Figure 12:
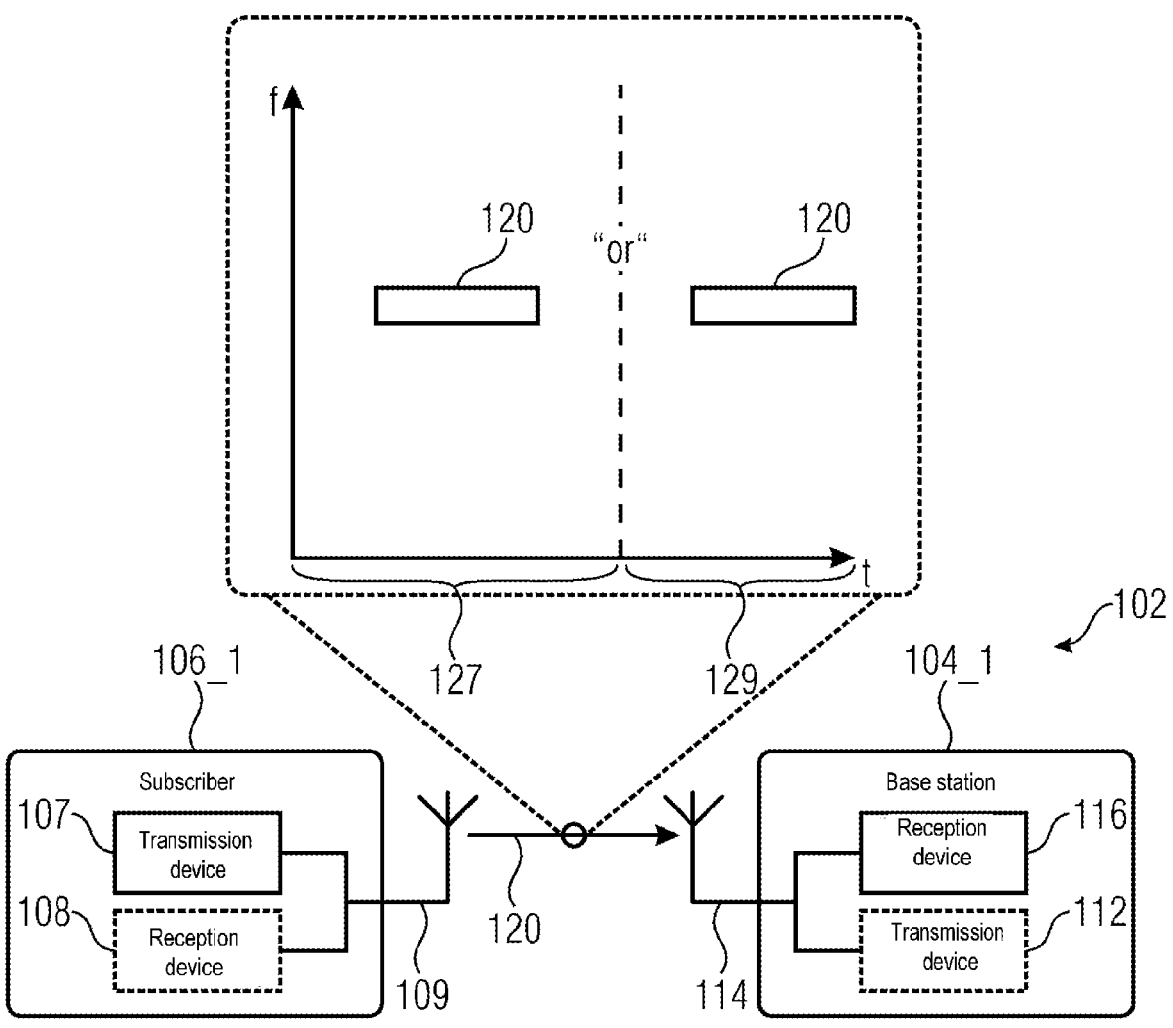
FIG. 12 is a schematic block diagram of a communication system with a base station and a subscriber, according to a further exemplary embodiment of the present invention.

Compared to the exemplary embodiment shown in FIG. 6, the exemplary embodiment shown in FIG. 12 involves the quality criterion of the at least one preceding transmission between the subscriber 106_1 and the base station 104_1 being taken as a basis for transmitting the data 120 not in different frequency ranges 126 and 128 (see FIG. 6) but rather in different time intervals 127 and 129.

In exemplary embodiments, the data 120 may naturally also be transmitted both in different frequency ranges 126 and 128 and in different time intervals 127 and 129 on the basis of the quality criterion.

In exemplary embodiments, it is thus possible for subscribers with different quality criteria (e.g. subscribers (e.g. sensor nodes) with strong reception and weak reception) not only to be split on the basis of frequency but also, alternatively or in combination, to be split using a kind of time-division multiplexing method. In this case, the subscribers that satisfy better quality criteria (e.g. subscribers (e.g. sensor nodes) with strong reception) are transmitted at staggered times in relation to the subscribers that satisfy poorer quality criteria (e.g. subscribers (e.g. sensor nodes) with weak reception). The respective time windows 127 and 129 may be signaled by the base station, for example, e.g. in the form of a radio beacon or during the registration process for a new subscriber.

3. Distinct Frequency Channel or Distinct Time Interval for Data Transmissions with High QoS Requirements In exemplary embodiments, the data 120 in the communication system 102 may also be transmitted in the first frequency range 126 and/or the first time interval 127, or in the second frequency range 128 and/or the second time interval 129 on the basis of a quality of service (QoS) as an alternative or in addition to on the basis of the quality criterion.

As such, in exemplary embodiments, the data 120 may be transmitted in the first frequency range 126 and/or first time interval 127 if the quality of service is in a first quality of service range or is less than or equal to a quality of service threshold, while the data 120 may be transmitted in the second frequency range 128 and/or second time interval 129 if the quality of service is in a second quality of service range or is greater than the quality of service threshold.

In exemplary embodiments, the quality of service may be at least one from a latency, a reaction time, a maximum blocking rate.

The division of subscribers 106_1-106_n (e.g. sensor nodes) into separate frequency bands 126 and 128 and/or separate time intervals 127 and 129 may also be used as an application view for applications with high quality requirements.

By way of example, some messages have a higher priority during transmission or need to have arrived at the receiver within a certain time interval. Examples of such transmissions are for example alarms or emergency shutdowns. However, there are also applications that need to guarantee for example that at least one message per time interval (e.g. per day or month) needs to be received at the receiver correctly.

So that these messages arrive at the receiver more safely, these messages may, in exemplary embodiments, exclusively or in combination with the previous exemplary embodiments, likewise be transmitted in the distinct frequency range 128 or the distinct time interval 129.

In exemplary embodiments, subscribers (e.g. sensor nodes) that satisfy better quality criteria (e.g. subscribers with good reception conditions) may thus also send individual messages with high QoS requirements to the base station 104_1 in the lower frequency band 128. This is not a problem as long as it does not occur too frequently.

In the previous example, in which at least one message per time interval needs to arrive at the receiver, the messages from a subscriber may be sent 100 times in the upper frequency band 126 and, just for safety, once in the lower frequency band 128, for example in a manner distributed over the interval.

If a bidirectional system is present, transmission may likewise take place in the upper frequency band 126. If the base station 104_1 acknowledges one of the messages sent in the upper frequency band 126 by using an acknowledgement of receipt (ACK), the subscriber does not need to transmit in the lower band. Only if an acknowledgement of receipt has not been obtained shortly before the end of the time interval does the subscriber transmit in the lower frequency band.

There are ranges in the 869 MHz band that are licensed for different maximum transmission power: 500 mW (27 dBm), 25 mW (14 dBm), 5 mW (7 dBm). It is therefore possible for e.g. the upper frequency range 126 to be in a range with a lower licensed transmission power.

4. Different Frequency-Time Patterns for Data Transmissions with High QoS Requirements or for Poor Vs Good Reception Conditions The text below describes further exemplary embodiments of the subscriber 106_1 and the base station 104_1, which may be used on their own or in combination with the exemplary embodiments of the subscriber 106_1 and the base station 104_1 that are described above.

Figure 13:
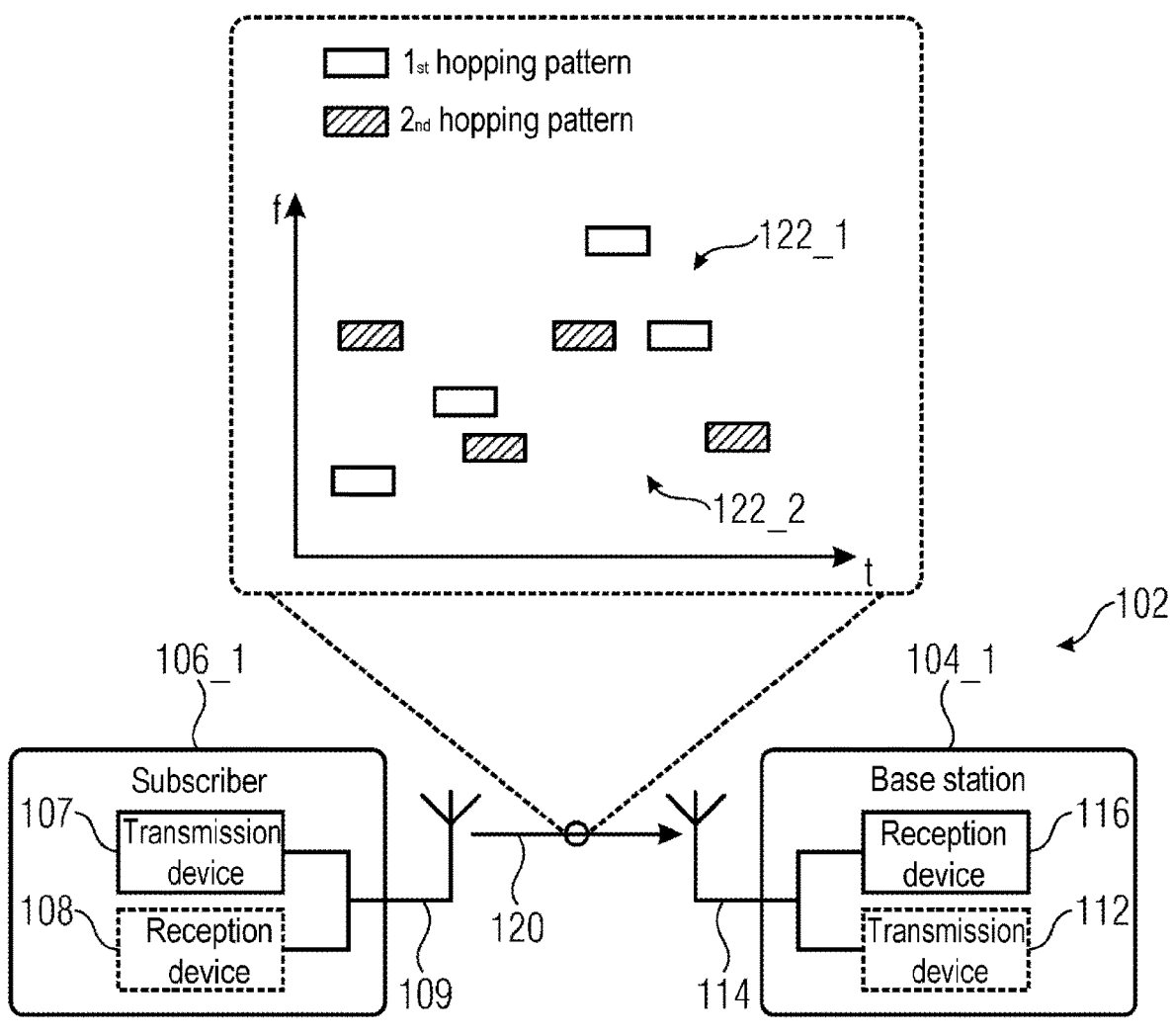
FIG. 13 is a schematic block diagram of a communication system with a base station and a subscriber, according to a further exemplary embodiment of the present invention.

FIG. 13 shows a schematic block diagram of a communication system 102 with a base station 104_1 and a subscriber 106_1, according to a further exemplary embodiment of the present invention.

The subscriber 106_1 is configured to send data 120 to the base station 104_1 in the communication system 102 and/or to receive data from the base station 104_1 in the communication system 102 in a manner distributed over time and/or frequency in accordance with a hopping pattern 122_1 or 122_2, wherein the hopping pattern 122_1 or 122_2 used for transmitting the data 120 is dependent on a position of the subscriber 106_1 in relation to the base station 104_1, and/or a quality criterion of at least one preceding transmission between the subscriber 106_1 and the base station 104_1, and/or a (e.g. measured or ascertained) channel load before the transmission of the data 120, and/or a demanded quality of service of the data 120.

The base station 104_1 may be configured to send data 120 to a subscriber 106_1 in the communication system 102 and/or to receive data from the subscriber 106_1 in the communication system 102 in a manner distributed over time and/or frequency in accordance with a hopping pattern 122_1 or 122_2, wherein the hopping pattern 122_1 or 122_2 used for transmitting the data 120 is dependent on a position of the subscriber 106_1 in relation to the base station 104_1, and/or a quality criterion of at least one preceding transmission between the subscriber 106_1 and the base station 104_1, and/or a (e.g. measured or ascertained) channel load before the transmission of the data 120, and/or a demanded quality of service of the data 120.

In exemplary embodiments, the data 120 may be transmitted in accordance with a first hopping pattern 122_1, or in accordance with a hopping pattern 122_1 selected from a first group of hopping patterns, if the position of the subscriber 106_1 falls within a first geographical region of a geographical area covered by the base station 106_1, while the data 120 may be transmitted in accordance with a second hopping pattern 122_2, or in accordance with a hopping pattern 122_2 selected from a second group of hopping patterns, if the position of the subscriber 106_1 falls within a second geographical region of the geographical area covered by the base station 106_1, the first hopping pattern 122_1 and the second hopping pattern 122_2 being different, the first region and the second region being different.

In exemplary embodiments, the data 120 may be transmitted in accordance with a first hopping pattern 122_1, or in accordance with a hopping pattern 122_1 selected from a first group of hopping patterns, if the quality criterion of the at least one preceding transmission is in a first quality criterion range or is greater than or equal to a quality criterion threshold, while the data 120 may be transmitted in accordance with a second hopping pattern 122_2, or in accordance with a hopping pattern 122_2 selected from a second group of hopping patterns, if the quality criterion of the at least one preceding transmission is in a second quality criterion range or is less than the quality criterion threshold.

The quality criterion of the at least one preceding transmission between the subscriber 106_1 and the base station 104 may be for example at least one from a reception level of the at least one preceding transmission, a bit error rate of the at least one preceding transmission, a block error rate of the at least one preceding transmission, a packet error rate of the at least one preceding transmission, a signal-to-noise ratio of the at least one preceding transmission, a signal-to-interference ratio of the at least one preceding transmission, in the case of multiple preceding transmissions, a ratio between a number of detected transmissions and a number of undetected transmissions.

In exemplary embodiments, the at least one preceding transmission may be a transmission (e.g. downlink data transmission or beacon transmission) from the base station 104_1 to the subscriber 106_1. In this case, the subscriber 106_1 may ascertain the quality criterion of the at least one preceding transmission itself, i.e. on the basis of the received transmission from the base station 104_1.

In exemplary embodiments, the at least one preceding transmission may be a transmission (e.g. uplink data transmission) from the subscriber 106_1 to the base station 104_1. In this case, the base station 104_1 may ascertain the quality criterion on the basis of the received transmission from the subscriber 106_1 and may send a data transmission (e.g. downlink data transmission) to the subscriber 106_1, the data transmission to the subscriber 106_1 including information about the quality criterion.

In exemplary embodiments, the data 120 may be transmitted in accordance with a first hopping pattern 122_1, or in accordance with a hopping pattern 122_1 selected from a first group of hopping patterns, if the quality of service of the data is in a first quality of service range or is less than or equal to a quality of service threshold, while the data 120 may be transmitted in accordance with a second hopping pattern 122_2, or in accordance with a hopping pattern 122_2 selected from a second group of hopping patterns, if the quality of service is in a second quality of service range or is greater than the quality of service threshold.

In exemplary embodiments, the quality of service may be at least one from a latency, a reaction time, a maximum blocking rate.

In exemplary embodiments, the data 120 may be transmitted in accordance with a first hopping pattern 122_1, or in accordance with a hopping pattern 122_1 selected from a first group of hopping patterns, if the measured or ascertained channel load (e.g. (shortly) before the data 120 are sent) is in a first channel load range or is less than or equal to a channel load threshold, while the data 120 may be transmitted in accordance with a second hopping pattern 122_2, or in accordance with a hopping pattern 122_2 selected from a second group of hopping patterns, if the measured or ascertained channel load (e.g. (shortly) before the data 120 are sent) is in a second channel load range or is greater than the channel load threshold.

In exemplary embodiments, it is naturally also possible to use more than two hopping patterns, or more than two groups of hopping patterns, for transmitting the data 120. By way of example, the geographical area served by the base station 104_1 may be split into at least three geographical regions, each of the at least three geographical regions having a respective associated hopping pattern or a respective associated group of hopping patterns. Equally, it is possible to perform a split into at least three quality criterion ranges (or quality of service ranges or channel load ranges), each of the at least three quality criterion ranges (or quality of service ranges or channel load ranges) having a respective associated hopping pattern or a respective associated group of hopping patterns.

In exemplary embodiments, the subscriber 106_1 may include a transmission device (or transmission module, or transmitter) 107 that is configured to send a transmission (e.g. an uplink data transmission). The transmission device 107 may be connected to an antenna 109 of the subscriber 106_1. Furthermore, the subscriber 106_1 may include a reception device (or reception module, or receiver) 108 that is configured to receive a transmission (e.g. downlink data transmission or beacon transmission or link transmission). The reception device 108 may be connected to the antenna 109 or to a further (separate) antenna of the subscriber 106_1. The system 106_1 may also include a combined transmission/reception device (transceiver).

In exemplary embodiments, the base station 104_1 may include a reception device (or reception module, or receiver) 116 that is configured to receive a transmission (e.g. uplink data transmission). The reception device 116 may be connected to an antenna 114 of the base station 104_1. Furthermore, the base station 104_1 may include a transmission device (or transmission module, or transmitter) 112 that is configured to send a transmission (e.g. downlink data transmission or beacon transmission or link transmission). The transmission device 112 may be connected to the antenna 114 or to a further (separate) antenna of the base station 104_1. The base station 104_1 may also include a combined transmission/reception device (transceiver).

As has already been explained thoroughly with reference to FIGS. 6 and 7, the subscriber 106_1 and the base station 104_1 may be configured to transmit data on the basis of the so-called telegram splitting method [3], as defined in ETSI TS 103 357, for example.

As has already been indicated, exemplary embodiments of the communication system 102 described in FIG. 13 may optionally be combined with exemplary embodiments of the communication system 102 described in FIGS. 6 to 12.

As such, in exemplary embodiments, the data 120 may be transmitted in the first frequency range 126 and/or first time interval 127 in accordance with a first hopping pattern 122_1, or in accordance with a hopping pattern 122_1 selected from a first group of hopping patterns, while the data 120 may be transmitted in the second frequency range 128 and/or second time interval 129 in accordance with a second hopping pattern 122_2, or in accordance with a hopping pattern 122_2 selected from a second group of hopping patterns.

In exemplary embodiments, the different hopping patterns may be differently orthogonal with respect to one another. The SIR of a first hopping pattern to a second hopping pattern is better than the SIR of the first hopping pattern to a third or fourth hopping pattern. By way of example, there may be 16 possible hopping patterns. It is therefore possible for e.g. the subscribers whose transmissions have better quality criteria (e.g. subscribers with good reception conditions) to use the first eight hopping patterns, while the subscribers whose transmissions have poorer quality criteria (e.g. subscribers with poorer reception conditions) are able to use the other eight hopping patterns.

In exemplary embodiments, the hopping patterns may be defined on the basis of at least one quality criterion (e.g. reception level). By way of example, the hopping patterns for subscribers with better (e.g. good) quality criteria and the hopping patterns for subscribers with worse (e.g. poor) quality criteria may be almost orthogonal with respect one another and accordingly (almost) not interfere with one another.

In exemplary embodiments, one or more hopping patterns may also be reserved for messages with high QoS requirements, such as e.g. alarms.

As has already been indicated, the hopping pattern used for transmitting the data 120 may be dependent on a position of the subscriber 106_1 in relation to the base station 104. In this case, it is possible for the geographical area served by the base station 104_1 to be divided into multiple geographical regions, each of the geographical regions having a respective associated hopping pattern (or a respective associated group of hopping patterns), as explained below with reference to FIG. 14.

Figure 14:
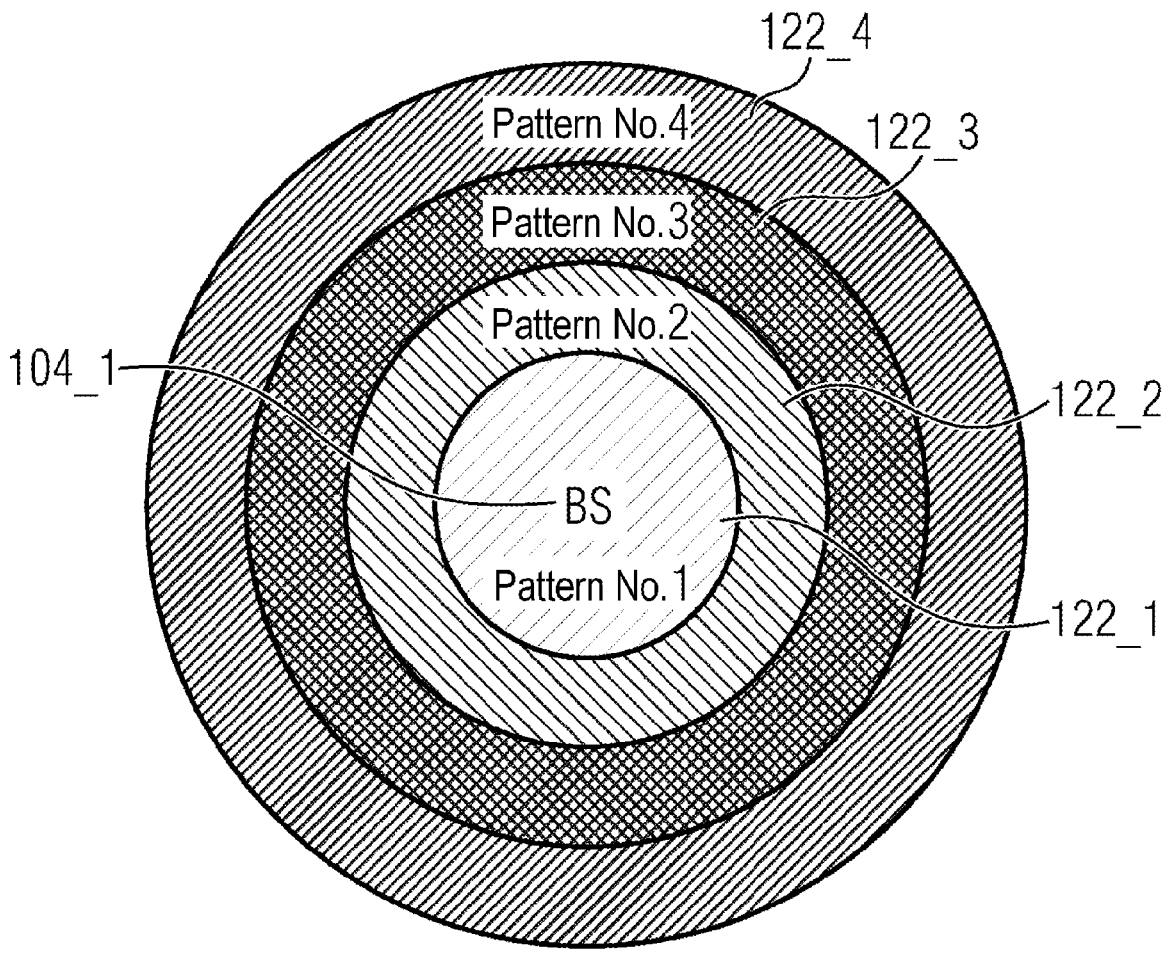
FIG. 14 is a schematic view of a base station and an association of four different hopping patterns with four different geometric regions served by the base station, according to an exemplary embodiment of the present invention.

FIG. 14 shows a schematic view of a base station 104_1 and an association of four different hopping patterns 122_1-122_4 (or four groups of different hopping patterns) with four different geometric regions served by the base station 104_1, according to an exemplary embodiment. As shown by way of illustration in FIG. 14, the geographical area served by the base station 104_1 may be divided into four geographical regions on the basis of a distance from the base station 104_1, wherein a first hopping pattern 122_1 (or a first group of hopping patterns) may be associated with a first geographical region, while a second hopping pattern 122_2 (or a second group of hopping patterns) may be associated with a second geographical region, while a third hopping pattern 122_3 (or a third group of hopping patterns) may be associated with a third geographical region, while a fourth hopping pattern 122_4 (or a fourth group of hopping patterns) may be associated with a fourth geographical region. The four hopping patterns 122_1-122_4 may be different, i.e. may indicate a different distribution over time and/or frequency.

In other words, FIG. 14 shows a geometric distribution of hopping patterns. FIG. 14 shows an example with four hopping patterns. The four hopping patterns are permanently associated on the basis of the distance (and hence indirectly the reception power) of the subscribers 106_1-106_$n$ (from the base station 104_1).

Figure 15:
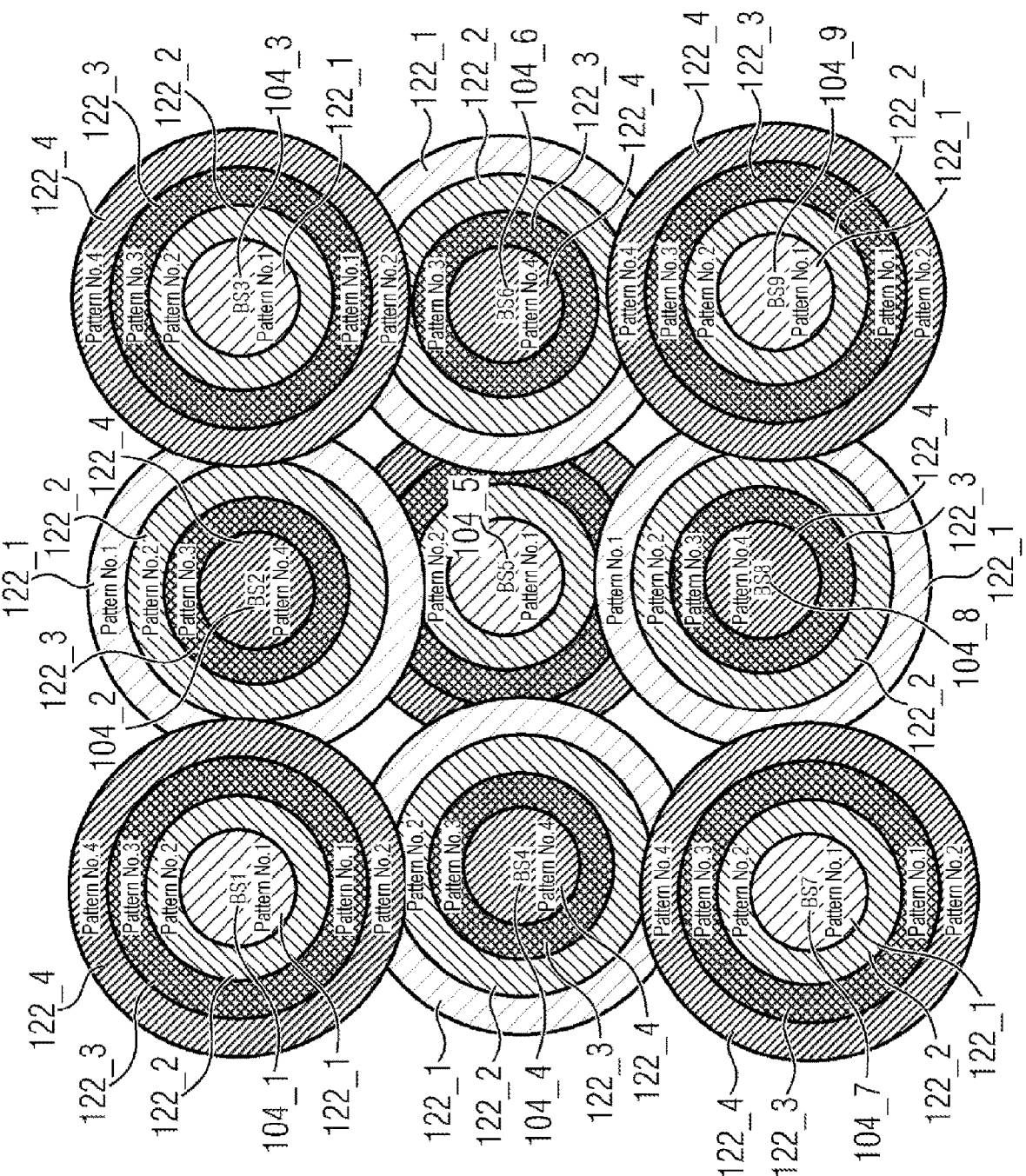
FIG. 15 is a schematic view of nine base stations and an association of four different hopping patterns with four particular different geometric regions served by a particular one of the nine base stations, according to an exemplary embodiment of the present invention.

FIG. 15 shows a schematic view of nine base stations 104_1-104_9 and an association of four different hopping patterns 122_1-122_4 (or four groups of different hopping patterns) with four particular different geometric regions served by a particular one of the nine base stations 104_1-104_9, according to an exemplary embodiment. As shown by way of illustration in FIG. 15, the geographical area served by a respective base station may be divided into four geographical regions on the basis of a distance from the respective base station. The geographical regions of directly adjacent base stations have the four hopping patterns 122_1-122_4 associated with them in exactly the opposite order.

In other words, FIG. 15 shows multiple radio cells. In order to lower intercell interference, adjacent base stations may be allocated the hopping patterns 122_1-122_4 unequally (see FIG. 15). In FIG. 15, the different circular, or annular, areas represent different hopping patterns 122_1-122_4. The hopping patterns 122_1-122_4 may be assumed to be orthogonal (in other words, barely interfere with one another/do not interfere with one another at all). As indicated in FIG. 15, a first base station 104_1 may use the first hopping pattern 122_1 for the subscribers with the best reception conditions, while a second base station 104_2 in an adjacent radio cell uses the first hopping pattern 122_1 for the subscribers with the poorest channel conditions. It is therefore possible to ensure that hopping patterns having the same numbers are present physically separate from one another. This means that even data transmitted with the hopping patterns do not interfere with one another, which allows intercell interference to be reduced.

It will be pointed out that the use of four hopping patterns is intended to be understood merely by way of illustration. As such, instead of four hopping patterns, a different number of hopping patterns or else groups of hopping patterns may also be used, such as e.g. four groups of hopping patterns. Each group of hopping patterns may include multiple hopping patterns, which are orthogonal or have good rejection with respect to another group of hopping patterns. On the basis of e.g. 16 available hopping patterns, four groups of hopping patterns may each have four hopping patterns, for example.

Adjacent radio cells may naturally also be assigned completely different hopping patterns. As such, for example one base station may use the hopping patterns 1-4, while an adjacent base station may use the hopping patterns 4-8.

An uneven split for the number of hopping patterns per group of hopping patterns is likewise possible. By way of example, a first group of hopping patterns may include two hopping patterns, while a second group of hopping patterns may include six hopping patterns.

Figure 16:
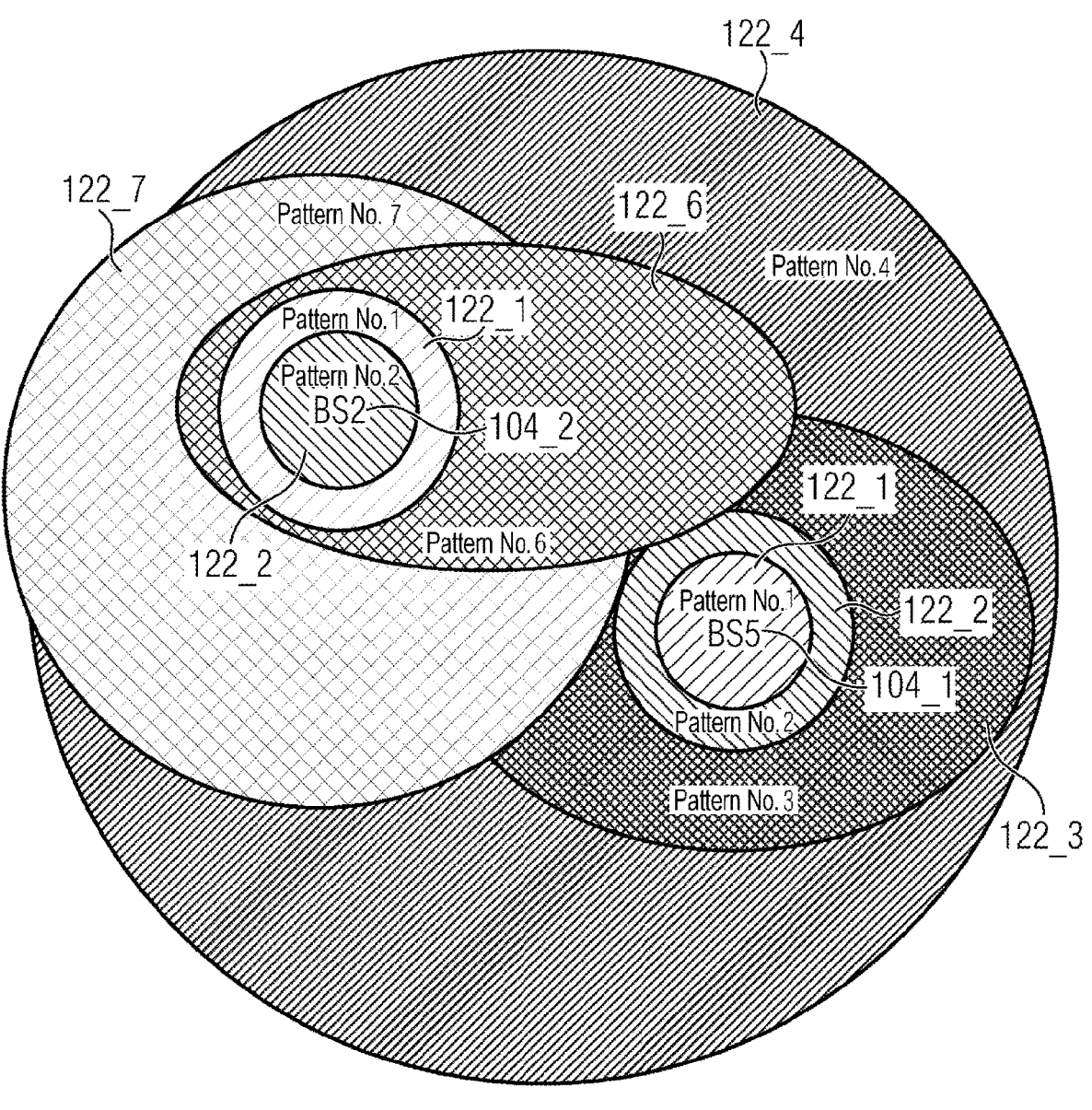
FIG. 16 is a schematic view of two base stations and an association of different hopping patterns with different particular geometric regions served by the two base stations, according to an exemplary embodiment of the present invention.

FIG. 16 shows a schematic view of two base stations 104_1 and 104_2 and an association of different hopping patterns (or four groups of different hopping patterns) with particular different geometric regions served by the two base stations 104_1 and 104_2, according to an exemplary embodiment.

As shown by way of illustration in FIG. 16, the geographical area served by the first base station 104_1 may be divided into four regions, wherein, based on the first base station 104_1, a first hopping pattern 122_1 may be associated with a first geographical region, wherein a second hopping pattern 122_2 may be allocated to a second geographical region, wherein a third hopping pattern 122_3 may be allocated to a third geographical region, and wherein a fourth hopping pattern 122_4 may be allocated to a fourth geographical region.

The geographical area served by the second base station 104_2 may be divided into five regions, wherein, based on the second base station 104_2, the second hopping pattern 122_2 may be associated with a first geographical region, wherein a first hopping pattern 122_1 may be allocated to a second geographical region, wherein a sixth hopping pattern 122_6 may be allocated to a third geographical region, wherein a seventh hopping pattern 122_7 may be allocated to a fourth geographical region, and wherein a fourth hopping pattern 122_4 may be allocated to a fifth geographical region.

A subscriber that uses the fourth hopping pattern 122_4 may therefore be received by both base stations 104_1 and 104_2.

In other words, FIG. 16 shows radio cells of unequal size. In this case, FIG. 16 shows an example in which the subscribers may be received by all of the base stations 104_1 and 104_2 in practice under good conditions. If all of the base stations 104_1 and 104_2 receive specific hopping patterns, then these hopping patterns should be allocated only once and not used again in the adjacent radio cells. An example is an installation of a subscriber (e.g. meter) on a roof of a multistory building and simultaneously in the cellar of a multistory building. In this case, the hopping pattern used by the subscriber disposed on the roof may not be reused for other subscribers.

In exemplary embodiments, the hopping patterns may therefore be communicated to the base stations adaptively by a central server (e.g. head end).

5. Further Exemplary Embodiments

Figure 17:
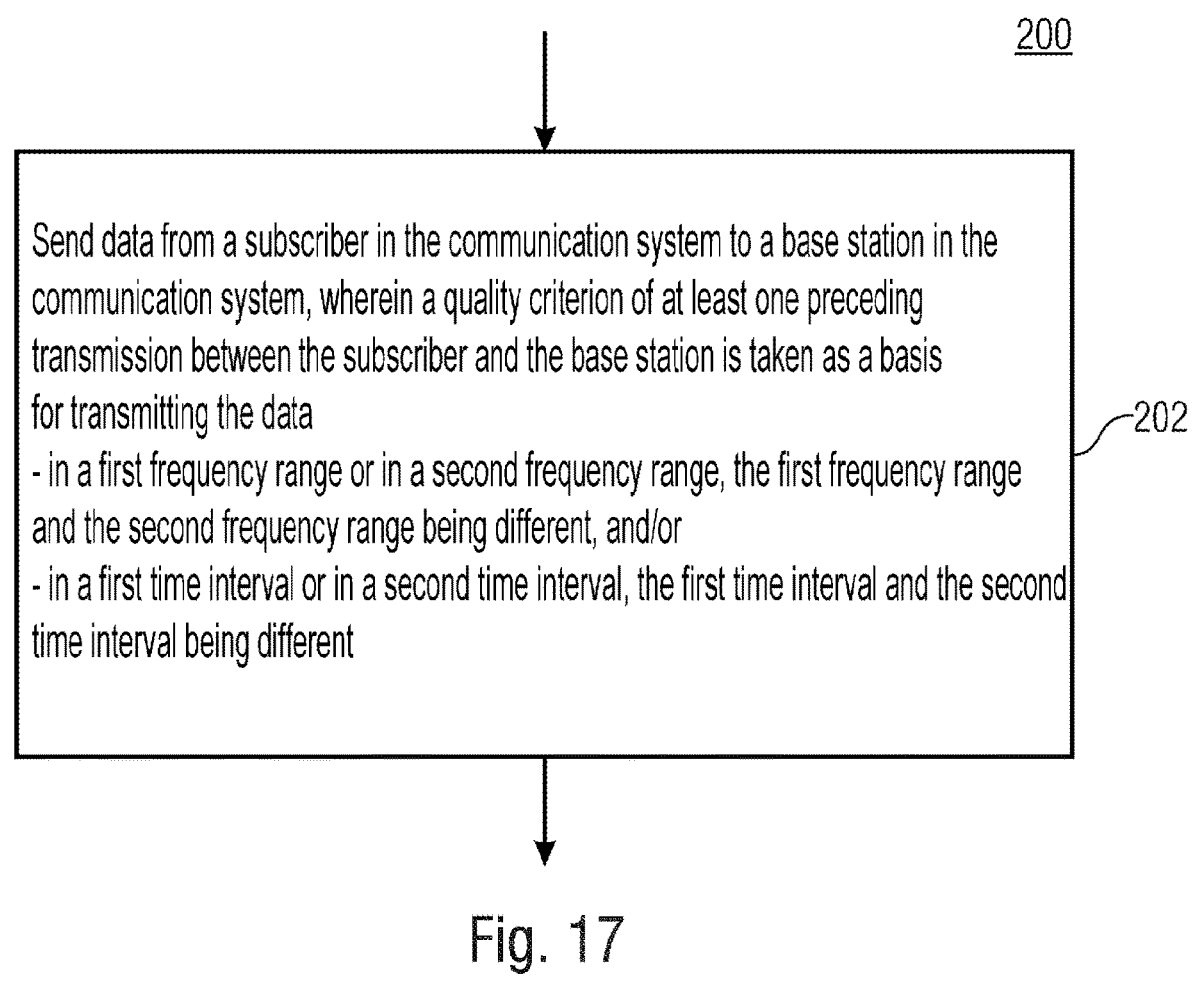

FIG. 17 shows a flowchart for a method 200 for sending data in a wireless communication system, wherein the communication system includes a multiplicity of uncoordinated subscribers. The method includes a step of sending data from a subscriber in the communication system to a base station in the communication system, wherein a quality criterion of at least one preceding transmission between the subscriber and the base station is taken as a basis for transmitting the data
in a first frequency range or in a second frequency range, the first frequency range and the second frequency range being different, and/or
in a first time interval or in a second time interval, the first time interval and the second time interval being different.

FIG. 18 shows a flowchart for a method 210 for receiving data in a wireless communication system, wherein the communication system includes a multiplicity of uncoordinated subscribers. The method includes a step of receiving data sent from a subscriber in the communication system to a base station in the communication system, wherein a quality criterion of at least one preceding transmission between the subscriber and the base station is taken as a basis for transmitting the data
in a first frequency range or in a second frequency range, the first frequency range and the second frequency range being different, and/or
in a first time interval or in a second time interval, the first time interval and the second time interval being different.

Figure 19:
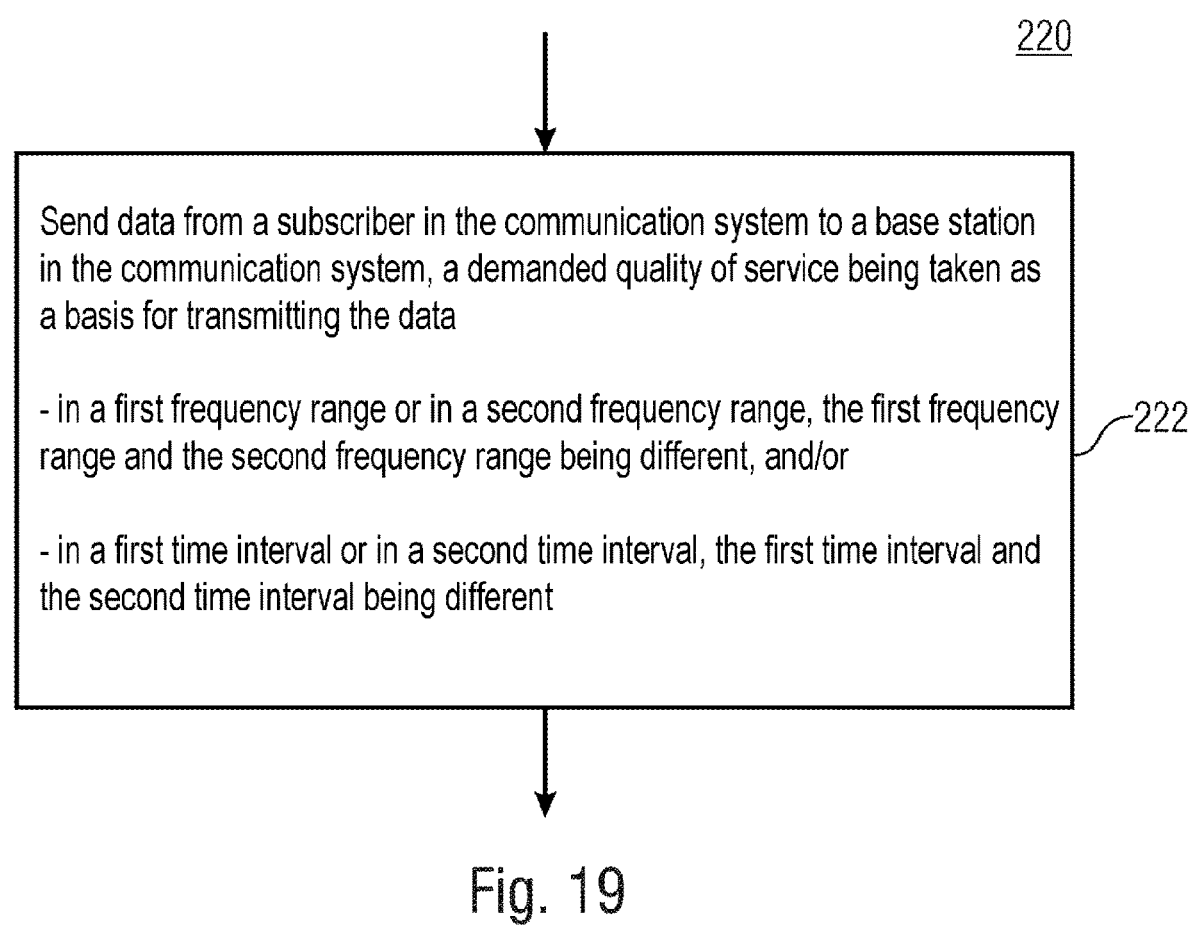

FIG. 19 shows a flowchart for a method 220 for sending data in a wireless communication system, wherein the communication system includes a multiplicity of uncoordinated subscribers. The method includes a step of sending data from a subscriber in the communication system to a base station in the communication system, wherein a demanded quality of service is taken as a basis for transmitting the data
in a first frequency range or in a second frequency range, the first frequency range and the second frequency range being different, and/or
in a first time interval or in a second time interval, the first time interval and the second time interval being different.

FIG. 20 shows a flowchart for a method 230 for receiving data in a wireless communication system, wherein the communication system includes a multiplicity of uncoordinated subscribers. The method includes a step of receiving data sent from a subscriber in the communication system to a base station in the communication system, wherein a demanded quality of service is taken as a basis for transmitting the data
in a first frequency range or in a second frequency range, the first frequency range and the second frequency range being different, and/or in a first time interval or in a second time interval, the first time interval and the second time interval being different.

FIG. 21 shows a flowchart for a method 240 for transmitting data in a wireless communication system. The method includes a step of transmitting data from a subscriber in the communication system to a base station in the communication system and/or from a base station in the communication system to a subscriber in the communication system in a manner distributed over time and/or frequency in accordance with a hopping pattern, wherein the hopping pattern used for transmitting the data is dependent on at least one from a position of the subscriber in relation to the base station, a quality criterion of at least one preceding transmission between the subscriber and the base station, a channel load before the transmission of the data, a demanded quality of service of the transmitted data.

Exemplary embodiments of the present invention are concerned with an IoT system (IoT=Internet of Things) with asymmetric data transmission from many subscribers (e.g. sensor nodes) to a base station by using a so-called competitive multiple access method [8]. Since any sensor node that is ready to send may access the uplink channel at will in this case, potentially very high co-channel interference arises in the user cell itself due to the lack of user orthogonality. Subscribers (e.g. sensor nodes) that have high path loss to the base station due to their great distance from the base station or due to their unfavorable positioning then have a very low CIR. This poor CIR means that it is frequently not possible for these sensor nodes to transmit their data to the base station correctly in specific predetermined intervals. As a result, a demanded QoS (QoS=Quality of Service) often cannot be observed. Exemplary embodiments of the present invention therefore use different (frequency) range assignment, which allows the interference power I to be decreased.

As already mentioned, the exemplary embodiments described herein may be used to transmit data between the subscribers in the communication system on the basis of the telegram splitting method. The telegram splitting method involves data, such as e.g. a telegram or data packet, being split into a plurality of sub-data packets (or partial data packets, or partial packets) and the sub-data packets being transmitted from one subscriber to another subscriber (e.g. from the base station to the endpoint, or from the endpoint to the base station) in the communication system in a manner distributed over time and/or frequency by using a time and/or frequency hopping pattern, the subscriber that receives the sub-data packets assembling (or combining) them again to obtain the data packet. Each of the sub-data packets contains only a portion of the data packet. The data packet may furthermore be channel-coded, which means that correct decoding of the data packet requires not all of the sub-data packets but rather only some of the sub-data packets.

Exemplary embodiments of the present invention may be used in, or extend, the communication system defined in ETSI TS 103 357 (v1.1.1).

Although some aspects have been described in connection with an apparatus, it goes without saying that these aspects are also a description of the corresponding method, which means that a block or a component of an apparatus is also intended to be understood as a corresponding method step or as a feature of a method step. Analogously, aspects described in connection with or as a method step are also a description of a corresponding block or detail or feature of a corresponding apparatus. Some or all of the method steps may be performed by hardware equipment (or using hardware equipment), such as for example a microprocessor, a programmable computer or an electronic circuit. In some exemplary embodiments, some or several of the most important method steps may be performed by such equipment.

Depending on specific implementation requirements, exemplary embodiments of the invention may be implemented in hardware or in software. The implementation may be performed using a digital storage medium, for example a floppy disk, a DVD, a BluRay disk, a CD, a ROM, a PROM, an EPROM, an EEPROM or a FLASH memory, a hard disk or another magnetic or optical memory storing electronically readable control signals that are able to interact or do interact with a programmable computer system in such a way that the respective method is performed. Therefore, the digital storage medium may be computer-readable.

Some exemplary embodiments according to the invention thus include a data carrier that has electronically readable control signals capable of interacting with a programmable computer system in such a way that one of the methods described herein is performed.

Generally, exemplary embodiments of the present invention may be implemented as a computer program product with a program code, the program code being effective to perform one of the methods when the computer program product runs on a computer.

The program code may also be stored on a machine-readable carrier, for example.

Other exemplary embodiments include the computer program for performing one of the methods described herein, the computer program being stored on a machine-readable carrier.

In other words, an exemplary embodiment of the method according to the invention is therefore a computer program that has a program code for performing one of the methods described herein when the computer program runs on a computer.

A further exemplary embodiment of the methods according to the invention is therefore a data carrier (or a digital storage medium or a computer-readable medium) on which the computer program for performing one of the methods described herein is recorded. The data carrier, the digital storage medium or the computer-readable medium are typically tangible and/or nontransitory or nontemporary.

A further exemplary embodiment of the method according to the invention is therefore a data stream or a sequence of signals that constitutes or constitute the computer program for performing one of the methods described herein. The data stream or the sequence of signals may be configured, by way of example, to the effect of being transferred through a data communication connection, for example over the Internet.

A further exemplary embodiment includes a processing device, for example a computer or a programmable logic component, which is configured or adapted to the effect of performing one of the methods described herein.

A further exemplary embodiment includes a computer on which the computer program for performing one of the methods described herein is installed.

A further exemplary embodiment according to the invention includes an apparatus or a system that is configured to transmit a computer program for performing at least one of the methods described herein to a receiver. The transmission may take place electronically or optically, for example. The receiver may be a computer, a mobile device, a storage device or a similar apparatus, for example. The apparatus or the system may include a file server for transmitting the computer program to the receiver, for example.

In some exemplary embodiments, a programmable logic component (for example a field programmable gate array, an FPGA) may be used to perform some or all functionalities of the methods described herein. In some exemplary embodiments, a field programmable gate array is able to cooperate with a microprocessor in order to perform one of the methods described herein. Generally, the methods in some exemplary embodiments are performed on the part of an arbitrary hardware apparatus. The latter may be universally usable hardware such as a computer processor (CPU) or hardware specific to the method, such as an ASIC, for example.

The apparatuses described herein may be implemented for example using hardware equipment, or using a computer, or using a combination of hardware equipment and a computer.

At least some of the apparatuses described herein, or of any components of the apparatuses described herein, may be implemented in hardware and/or in software (computer program).

The methods described herein may be implemented for example using hardware equipment, or using a computer, or using a combination of hardware equipment and a computer.

At least some of the methods described herein, or of any components of the methods described herein, may be implemented by hardware and/or by software.

The exemplary embodiments described above are merely an illustration of the principles of the present invention. It goes without saying that modifications and variations to the arrangements and details described herein will become apparent to other persons skilled in the art. It is therefore intended that the invention be limited merely by the scope of protection of the patent claims that follow rather than by the specific details that have been presented herein on the basis of the description and the explanation of the exemplary embodiments.

The following is a summary list of reference numerals and the corresponding structure used in the above description of the invention.

LIST OF REFERENCES

[1] 3rd Generation Partnership Project 3GPP TR 45.820, "Cellular system support for ultra-low complexity and low throughput Internet of Things (CIoT)"

[2] 3rd Generation Partnership Project 3GPP TR 38.913, "Study on Scenarios and Requirements for Next Generation Access Technologies", v14.0.0.

[3] German Patent DE 10 2011 082 098 B4, corresponding to U.S. Pat. Nos. 9,354,081 and 10,039,084

[4] ETSI TS 103 357, "V1.1.1 (2018-06)

[5] G. Kilian, H. Petkov, R. Psiuk, H. Lieske, F. Beer, J. Robert, and A. Neuberger, "Improved coverage for low-power telemetry systems using telegram splitting," in Proceedings of 2013 European Conference on Smart Objects, Systems and Technologies (SmartSysTech), 2013

[6] G. Kilian, M. Breiling, H. H. Petkov, H. Lieske, F. Beer, J. Robert, and A. Neuberger, "Increasing Transmission Reliability for Telemetry Systems Using Telegram Splitting," IEEE Transactions on Communications, vol. 63, no. 3, pp. 949-961, March 2015

[7] C. Lüders, "Mobilfunksysteme. Grundlagen, Funktionsweise, Planungsaspekte", Vogel Buchverlag, Kamprath-Reihe, 2001

[8] M. Bossert, M. Breitenbach, "Digitate Netze", B. G. Teubner Stuttgart-Leipzig, 1999

[9] W. Koch, "Grundlagen der Mobilkommunikation", lecture notes at the WS 2010/2011, chair of mobile communication, University of Erlangen-Nuremberg, 2011

[10] 3GPP TSG RAN1#88 Athens, R1-1703865, "On 5G mMTC requirement fulfilment, NB-IoT and eMTC connection density", source Ericsson, Feb. 13-17, 2017

[11] A. Aragon-Zavala, "Indoor Wireless Communications: From Theory to Implementation", John Wiley & Sons, 2017

The invention claimed is:

1. A wireless communication system having a multiplicity of subscribers, wherein the improvement comprises:
   a subscriber configured to send data to a base station in the communication system;
   the subscriber configured to take a demanded quality of service of the data to be transmitted as a basis for transmitting the data in at least one of:
      a first frequency range or a second frequency range, the first frequency range and the second frequency range being different, or
      a first time interval or a second time interval, the first time interval and the second time interval being different; and
   the demanded quality of service being selected from at least one of:
      a demanded latency, or
      a demanded reaction time, or
      a demanded maximum blocking rate.

2. A wireless communication system having a multiplicity of subscribers, wherein the improvement comprises:
   a base station configured to receive data from a subscriber in the communication system;
   the data having a demanded quality of service being taken as a basis for transmitting the data in at least one of:
      a first frequency range or a second frequency range, the first frequency range and the second frequency range being different, or
      a first time interval or a second time interval, the first time interval and the second time interval being different; and
   the demanded quality of service being selected from at least one of:
      a demanded latency, or
      a demanded reaction time, or
      a demanded maximum blocking rate.

3. The wireless communication system according to claim 2, wherein:
   the data are transmitted in at least one of the first frequency range or the first time interval when the demanded quality of service is in a first quality of service range or is greater than or equal to a quality of service threshold; and
   the data are transmitted in at least one of the second frequency range or the second time interval when the demanded quality of service is in a second quality of service range or is less than the quality of service threshold.

4. The wireless communication system according to claim 2, wherein:
   the data transmitted in at least one of the first frequency range or first time interval are provided with a first code rate;
   the data transmitted in at least one of the second frequency range or second time interval are provided with a second code rate; and the first code rate is greater than the second code rate.

5. The wireless communication system according to claim 2, wherein:

the data are transmitted in at least one of the first frequency range or first time interval in accordance with a first hopping pattern' the data are transmitted in at least one of the second frequency range or second time interval in accordance with a second hopping pattern; and the first hopping pattern and the second hopping pattern are different.

6. The wireless communication system according to claim 3, wherein:

the first hopping pattern is selected from a first group of hopping patterns associated with at least one of the first frequency range or first time interval;

the second hopping pattern is selected from a second group of hopping patterns associated with at least one of the second frequency range or second time interval; and the first group of hopping patterns and the second group of hopping patterns are different.

\* \* \* \* \*